United States Patent [19]
Song

[11] Patent Number: 6,012,079
[45] Date of Patent: Jan. 4, 2000

[54] CONDITIONAL SUM ADDER USING PASS-TRANSISTOR LOGIC AND INTEGRATED CIRCUIT HAVING THE SAME

[75] Inventor: Min-Kyu Song, Seoul, Rep. of Korea

[73] Assignee: Samsung Electronics, Co., Ltd., Suwon, Rep. of Korea

[21] Appl. No.: 08/993,936

[22] Filed: Dec. 18, 1997

[30] Foreign Application Priority Data

Dec. 18, 1996 [KR] Rep. of Korea ........................ 96-67478

[51] Int. Cl.[7] ................................ G06F 7/50; G06F 7/52
[52] U.S. Cl. .......................... 708/714; 708/710; 708/629
[58] Field of Search .................................. 708/710–714, 708/629–630

[56] References Cited

U.S. PATENT DOCUMENTS

| | | | |
|---|---|---|---|
| 4,622,648 | 11/1986 | Whitaker | 364/787.04 |
| 4,858,168 | 8/1989 | Hwang | 364/784.03 |
| 4,879,675 | 11/1989 | Brodnax | 364/738 |
| 5,040,139 | 8/1991 | Tran | 364/760 |
| 5,258,943 | 11/1993 | Gamez et al. | 364/745 |
| 5,511,016 | 4/1996 | Bechade | 364/745 |
| 5,608,741 | 3/1997 | Kumar et al. | 371/49.1 |
| 5,671,171 | 9/1997 | Yu et al. | 364/748 |

OTHER PUBLICATIONS

Norio Ohkubo, Makoto Suzuki, Toshinobu Shinbo, Toshiaki Yamanaka, Akihiro Shimizu, Katsuro Sasaki, and Yoshinobu Nakagome "A 4.4 ns CMOS 54×54–b Multiplier Using Pass–Transistor Multiplexer", Mar. 1995, IEEE Journal of Solid–State Circuits, vol. 30, No. 3, pp. 251–256.

Primary Examiner—Tan V. Mai
Attorney, Agent, or Firm—Marger Johnson & McCollom, P.C.

[57] ABSTRACT

Disclosed is an integrated pass-transistor logic circuit which includes a conditional sum adder. This sum adder has seven sum generation blocks of module form and two carry generation blocks. With the sum adder, before carry propagation which is generated through multiplexer chain in respective sum generation blocks arrives at the final stage of the multiplexer chain, the final stage is driven by block carry signals $BC_i$ and $/BC_i$ provided from the respective carry generation blocks. The carry generation and the sum generation occur individually in the conditional sum adder. The sum generation blocks are constituted with pass-transistor logic and the carry generation blocks with Complementary Metal Oxide Semiconductor (CMOS) logic, the sum adder has a more faster operation speed and a more lower power dissipation, as compared with the prior art conditional sum adder having either the pass-transistor logic or the CMOS logic.

44 Claims, 31 Drawing Sheets

TIMEP[ns]

CONDITIONAL SUM ADDER USING PASS-TRANSISTOR LOGIC AND INTEGRATED CIRCUIT HAVING THE SAME

FIELD OF THE INVENTION

The present invention relates to integrated pass-transistor logic circuits, and more particularly to a conditional sum adder (CSA) using pass-transistor logic (PL) and an integrated circuit embodying the same.

BACKGROUND OF THE INVENTION

Major aims of circuit designs are to develop integrated circuits having increased speed, smaller size and lower power consumption. CMOS (Complementary Metal Oxide Semiconductor) circuits have lower power consumption and superior performance characteristics, as compared to NMOS (N-type MOS), PMOS (P-type MOS), or bipolar circuits. CMOS design technology serves as the technology of choice in designing complex monolithic systems having dense logic, low power dissipation, low supply voltage and highly automated synthesis.

CMOS static logic circuits, however, may be frequently operated in a manner where both of the PMOS and NMOS transistors forming a CMOS inverter are simultaneously turned on. Since this leads to large leakage current in the CMOS inverter, such CMOS static logic circuits are not suitable for high-speed operation with low power. Therefore, in high speed and low power applications, either operational speed or low power must be compromised to consider a CMOS design. Alternatively, a balance of both the low power and operational speed is required to design CMOS devices. This limits the design flexibility of the CMOS design.

In several applications, pass-transistor logic (PL) circuits have been used to substantially reduce circuit size without increasing power and reducing operational speed. Introducing such PL circuits eases the trade-offs as stated above.

FIG. 1 shows a 1-bit full adder as an example of the prior art PL circuit. As shown in FIG. 1, the 1-bit full adder has a functional block (FB) 2 and a level restoration block (LRB) 4. The functional block 2 is formed using only NMOS transistors so as to operate at high speed and with low power and to minimize it's chip area. It performs the addition operation of three input signals A, B and C to provide a sum signal SUM, a carry signal CARRY and complementary signals /SUM and /CARRY, respectively. (Note: In this specification, we will use the virgule "/" leading a signal name to indicate the complement signal.) The level restoration block 4 restores a marginally high level signal provided from the functional block 2 to a full high level—substantially the supply voltage $V_{DD}$. The marginal high level signal has voltage $V_{DD}-V_{TN}$, where $V_{TN}$ represents the threshold voltage of the NMOS transistor.

Prior art level restoration circuits are illustrated in FIGS. 2A through 2D. The circuit of FIG. 2A is a level restoration circuit used in complementary pass-transistor logic (CPL). This level restoration block of the CPL is formed with a pair of CMOS inverters.

In this CPL level restoration block, for example, when a strong or full low level signal (i.e., a ground level signal $V_{SS}$) is applied to an input terminal IN thereof, the PMOS transistor of the first inverter is made conductive. A high level signal $V_{DD}$ is then output from an output terminal of the level restoration block (i.e., the output terminal /OUT of the first inverter). When a marginal high level signal $V_{DD}-V_{TN}$ is applied to the other input terminal /IN of the level restoration block, the NMOS transistor of the second inverter turns on so that the weak high level signal is output from the other output terminal of the level restoration block (i.e., the output terminal OUT of the second inverter). This phenomenon occurs because the PMOS transistor of the second inverter is not completely turned off due to the weak high level signal $V_{DD}-V_{TN}$. Therefore, since the PMOS transistor is not completely turned off, some leakage current normally flows through the PMOS transistor. Consequently, the operating speed of the CPL level restoration block can be improved, but at a penalty of increased power consumption.

To address the above mentioned problems of the CPL level restoration block, several circuits such as PMOS latched type CPL, standalone type and SRPL (swing restored pass-transistor logic) level restoration circuits, as shown in FIGS. 2B to 2D, respectively, have been proposed. Of these improved level restoration circuits, particularly the SRPL level restoration circuit is formed using only CMOS inverters, similarly to the CPL level restoration circuit of FIG. 2A. However, in FIG. 2D, one input terminal IN of the level restoration block is commonly connected to the output terminal /OUT of the first inverter and to the input terminal of the second inverter, and the other input terminal /IN thereof is commonly connected to the output terminal OUT of the second inverter and to the input terminal of the first inverter. In such a SRPL level restoration circuit, when a marginal high level signal $V_{DD}-V_{TN}$ from the functional block 2 is applied to the input terminal thereof, the weak high level signal is output via one output terminal (i.e., the output terminal /OUT of the first inverter) of the level restoration circuit. The weak high level signal is also applied to the input terminal of the second inverter, so that the NMOS transistor of the second inverter is turned on. The other terminal of the level restoration block (i.e., the output terminal OUT of the second inverter) is then pulled down to a solid low level—substantially equal to $V_{SS}$ or ground, so that the PMOS transistor of the second inverter is completely turned off. As a result, no leakage current flows through the PMOS transistor.

However, while the SRPL level restoration circuit is excellent in restoring a weak high level signal to the $V_{DD}$ level, the output voltage thereof is discharged through the NMOS transistors of the functional block 2. In a logic circuit in which cascaded NMOS transistors are connected in series like a full adder, the discharging time is largely lengthened. This characteristic increases operational delay time.

It is imperative to improve floating-point performance in high performance microprocessors having operating frequencies, for example, of about 200 MHz or more. With the increase in demand for multimedia applications, high-speed multiplication is particularly critical in reduced instruction set computers (RISC), digital signal processing (DSP), graphics accelerators and the like. A high-speed 54×54-bit multiplier has been disclosed in the IEEE Journal of Solid-State Circuits entitled "A 4.4 ns CMOS 54×54-b Multiplier Using Pass-Transistor Multiplexer," Vol. 30, No. 3, pp. 251–257, March, 1995. The multiplier structure is shown in FIG. 3.

Referring to FIG. 3, the multiplier is constructed using Booth's algorithm and a Wallace tree configuration. The multiplier has a Wallace tree compressor 14 coupled to a modified Booth's encoder (MBE) 12 and a 108-bit conditional sum adder (CSA) 16. This adder 16 is called a conditional carry-selection adder or a "carry lookahead" adder. The Wallace tree compressor 14 comprises fifty-four 4-to-2 compression units. Fifty-four vertical data signals from the modified Booth's encoder 12 are provided to the fifty-four compression units, respectively. Each vertical data signal, which has a 32-bit partial product, is finally compressed to a 1-bit carry signal and a 1-bit sum signal by means of a corresponding compression unit. The carry and sum signals provided by each compression unit have the same delay time with respect to other compression units. The final carry and sum signals from the compressor 14 are provided to the 108-bit conditional sum adder 16. This 10-bit conditional sum adder 16 generates the final data signal of the (54×54)-bit multiplier. However, since the multiplier implements a modified Booth's encoder to produce vertical data signals, the multiplier hardware structure is complicated.

FIG. 4A shows a pass-transistor multiplexer used in both the 4-to-2 compressor and the 108-bit conditional sum adder. FIG. 4B is a detailed circuit diagram of the pass-transistor multiplexer of FIG. 4A. Referring to FIG. 4B, when a control signal S is at low level, data signal D0 is selected. When the control signal S is at high level, data signal D1 is selected. The output signal of the multiplexer is used as an input signal of a next stage multiplexer.

FIGS. 5A and 5B show the 108-bit conditional sum adder of FIG. 3 in greater detail. In FIGS. 5A and 5B, the prior art 108-bit conditional sum adder has fourteen half-adder blocks (HA), a first group of fourteen first carry lookahead adder blocks (CLA1's), a second group of seven second carry lookahead blocks (CLA2's), three multiplexers (MUX) and fourteen conditional sum selection blocks (CSS). One half-adder HA and one carry lookahead adder block CLA1 of the first carry lookahead adder blocks constitute one 8-bit moduled conditional carry selection block as seen in FIG. 6. One example of the second carry lookahead adder blocks is shown in FIG. 7.

Returning to FIGS. 5A and 5B, in the 108-bit conditional sum adder, the delay time caused by one multiplexer is $t_{MUX}$, a time interval between the input and output signals of the conditional sum adder. Each input signal of the conditional sum adder is delayed by $t_{MUX}$ in the half-adder, further delayed by $4t_{MUX}$ in the first lookahead adder block CLA1, further delayed by $3t_{MUX}$ in the second lookahead adder block CLA2, further delayed by $3t_{MUX}$ in the serially connected three multiplexers, and finally delayed by one more $t_{MUX}$ in the conditional sum selection block CSS. Thus, the delay time of all multiplexers is $12t_{MUX}$.

The critical path as stated above is caused by simultaneously generating the sum signal and the carry signal. Since carry propagation time is long relative to sum propagation time, the operating speed of the conditional sum adder is determined by the carry propagation signal.

In addition, however fast the propagation of the sum signal is up to the final output, since the carry and sum signals in the prior art conditional sum adder must be propagated to a next stage multiplexer, a final output signal is delayed by $t_{MUX}$ beyond the completion of the final carry signal.

SUMMARY OF THE INVENTION

It is therefore an object of the present invention to provide a conditional sum adder that has an improved operation speed.

It is another object of the present invention to provide a conditional sum adder that operates with low power consumption.

It is an additional object of the present invention to provide a conditional sum adder with an operational speed determined by a sum propagation signal.

It is a further object of the present invention to provide a carry generation circuit that has carry propagation faster than sum propagation in the conditional sum adder.

It is another object of the present invention to provide a (54×54)-bit multiplier having a high-speed conditional sum adder and a compressor in which an encoder for directly compressing an input data signal is provided without using a Booth's encoder.

It is an additional object of the present invention to provide an energy economized pass-transistor logic circuit that has high-speed operation characteristics in a small chip area.

According to one aspect of the present invention, an N-bit conditional sum adder, wherein N is the number of adding bits, comprises K M-bit sum generators and X L-bit carry generators, wherein K is equal to ⌈N/M⌉, X is equal to ⌈K/L⌉, and ⌈ ⌉ represents the ceiling function, returning the smallest integer greater than or equal to its input parameter. Each of the M-bit sum generators receives a first M-bit input signal, a complementary signal to the first M-bit input signal, a second M-bit input signal, a complementary signal to the second M-bit input signal, one carry signal corresponding to an L-bit carry signal or a complementary signal to the L-bit carry signal, and a complementary signal to the carry signal, and generates an M-bit sum signal. The first to the (X−1)-th carry generators each receive (L×M)-bit carry generation signal and a (L×M)-bit carry propagation signal from a corresponding M-bit sum generator and generates an L-bit carry signal and its complement. The X-th carry generator receives the other carry generation and propagation signals from the other M-bit sum generators, and generates the carry signal and its complement.

Each of the M-bit sum generators preferably comprises a (6×M)-bit pre-carry and pre-sum generation block. The (6×M)-bit pre-carry and pre-sum generation block includes means for receiving a first M-bit input signal, a complementary signal to the first M-bit input signal, a second M-bit input signal, a complementary signal to the second M-bit input signal, and means for generating a first M-bit conditional sum signal, a second M-bit conditional signal, an M-bit carry propagation signal, a complementary signal to the M-bit carry propagation signal, an M-bit carry generation signal, and a complementary signal to the M-bit carry generation signal. The M-bit carry lookahead block includes means for receiving the first M-bit conditional sum signal, the second M-bit conditional signal, the M-bit carry generation signal, the complementary signal to the M-bit carry generation signal, the M-bit carry propagation signal, the complementary signal to the M-bit carry propagation signal, one carry signal corresponding to the L-bit carry signal or the complementary signal to the L-bit carry signal, and the complementary signal to the carry signal, and generating the M-bit sum signal.

According to another aspect of the present invention, an integrated pass-transistor logic circuit comprises an encoding means for receiving a first 54-bit data signal and a second 54-bit data signal and generating a first to a fifty-fourth 54-bit vertical data signals, wherein the encoding means generates the second 54-bit data signal as a corresponding vertical data signal when a bit value of the first 54-bit data signal is at logical "1" state, and generates a vertical data signal of logical "0" state when a bit value of the first 54-bit data signal is at logical "0" state. The integrated pass-transistor logic circuit further includes a compressing means for receiving the first to fifty-fourth vertical data signals and compressing each of the vertical data signals to a 2-bit signal to generate a 54-bit sum signal and a 54-bit carry signal, and an adding means for adding the 54-bit sum signal and the 54-bit carry signal from the compressing means.

The adding means preferably comprises a first to a seventh 16-bit sum generators, each of which receives a first 16-bit input signal, a complementary signal to the first 16-bit input signal, a second 16-bit input signal, a complementary signal to the second 16-bit input signal, one carry signal corresponding to a 4-bit carry signal or a complementary signal to the 4-bit carry signal, and a complementary signal to the one carry signal. The adding means generates a 16-bit sum signal. The adding means further comprises a first carry generator for receiving a 64-bit carry generation signal and a 64-bit carry propagation signal from four corresponding sum generators, and generating the 4-bit carry signal and the complementary signal to the 4-bit carry signal and a second carry generator for receiving the other carry generation and propagation signals and generating the carry signal and the complementary signal to the carry signal.

BRIEF DESCRIPTION OF THE DRAWINGS

The present invention may be better understood and its objects will become more apparent to those skilled in the art by reference to the accompanying drawings as follows.

DETAILED DESCRIPTION OF PREFERRED EMBODIMENTS

Figure 8:
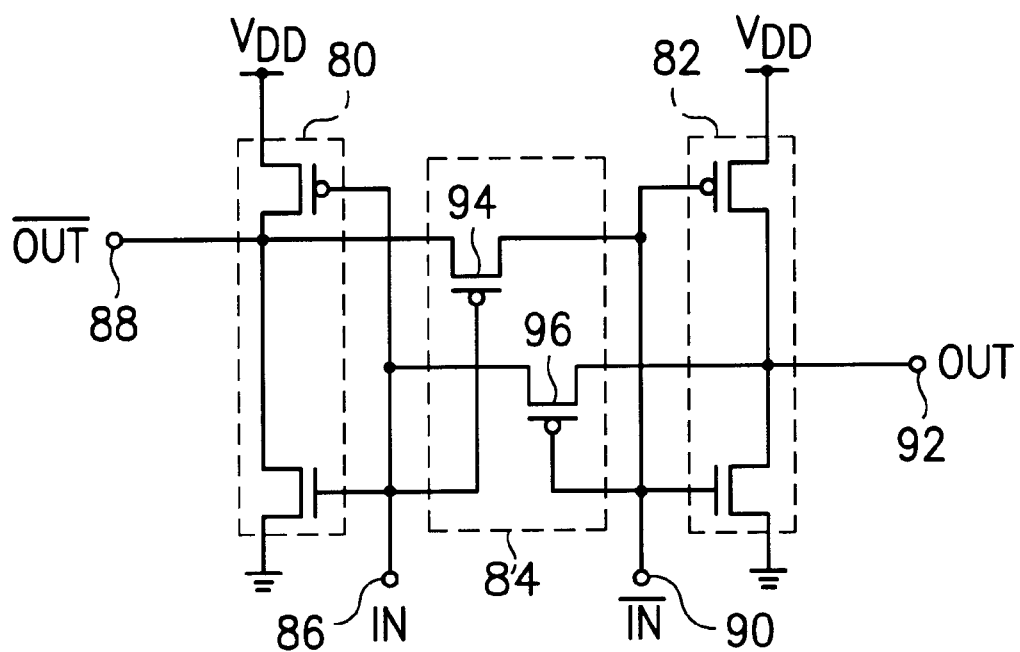
FIG. 8 is a detailed circuit diagram of a level restoration circuit according to a preferred embodiment of the present invention.

FIG. 8 shows a level restoration circuit of EEPL (energy economized pass transistor logic) according to a preferred embodiment of the present invention. Referring to FIG. 8, the level restoration circuit has two CMOS inverters 80 and 82 (hereinafter, referred to as "first inverter" and "second inverter," respectively), and a regenerative feedback generator 84 which is connected between the input and output of the first and second inverters 80 and 82. The regenerative feedback generator 84 comprises two PMOS transistors 94 and 96. The PMOS transistor 94 has a gate which is connected to a first input 86 (i.e., the input of the first inverter 80), and a current path which is connected between a first output 88 (i.e., the output of the first inverter 80) and a second input 90 (i.e., the input of the second inverter 82). The PMOS transistor 96 has a gate which is connected to the second input 90, and a current path which is connected between the first input 86 and a second output 92 (i.e., the output of the second inverter 82). The current path of each PMOS transistor is also called a source-drain channel.

Figure 1:
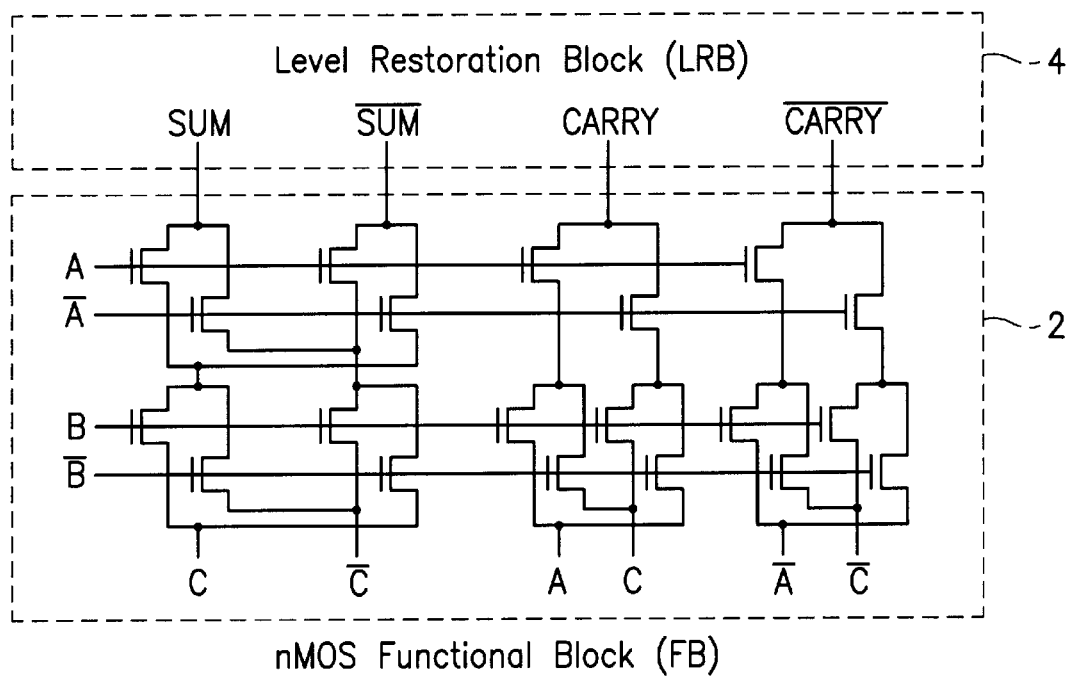
FIG. 1 is a circuit diagram showing the construction of a typical 1-bit full adder using pass-transistor logic.

In the level restoration circuit of FIG. 8, when an input signal IN of low level is applied to the first input 86, a complementary signal /IN to the input signal IN must be at high level. Conversely, when the input signal IN is at high level, the complementary signal /IN must be at low level. It may be recalled from the description of FIG. 1 that a high level signal provided from an NMOS functional block 2 is a weak high level signal ($V_{DD}-V_{TN}$), as mentioned above.

Turning again to FIG. 8, if the first input signal IN is a weak high level signal ($V_{DD}-V_{TN}$), the second input signal /IN, being a complementary signal thereof, is a strong low level signal $V_{SS}$ and thereby the PMOS transistor of the second inverter 82 is completely turned on. The second output 92 is then at a strong high level $V_{DD}$, and the PMOS transistor 96 of the regenerative feedback generator 84 is made conductive by the second input signal /IN of strong low level. As a result, the second output signal OUT with its strong high level $V_{DD}$ is applied to the first inverter 80 as a positive feedback signal. Therefore, the PMOS transistor of the first inverter 80 is completely turned off (or made non-conductive) so that no leakage current flows through the PMOS transistor. Also, the NMOS transistor of the first inverter 80 is completely turned on (or made conductive) so that the first output 88 is at strong low level $V_{SS}$.

On the other hand, when the second input signal /IN is a weak high level signal ($V_{DD}-V_{TN}$), the first input signal IN, being a complementary signal thereof, is at strong low level $V_{SS}$ and the PMOS transistor of the first inverter 80 is completely turned on. The first output 88 is then at strong high level $V_{DD}$, and the PMOS transistor 94 of the regenerative feedback generator 84 is made conductive by the first input signal IN of strong low level. As a result, the first output signal /OUT with its strong high level $V_{DD}$ is applied to the second inverter 82 as a positive feedback signal. Therefore, the PMOS transistor of the second inverter 82 is completely turned off so that no leakage current flows through the PMOS transistor. Also, the NMOS transistor of the second inverter 82 is completely turned on so that the second output 92 is at strong low level $V_{SS}$.

Figure 2A:
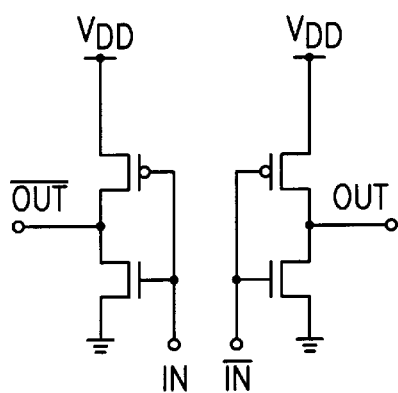
FIGS. 2A through 2D are detailed circuit diagrams of prior art level restoration circuits.
Figure 2B:
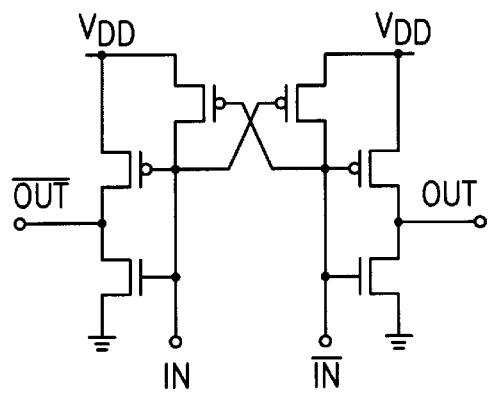
Figure 2C:
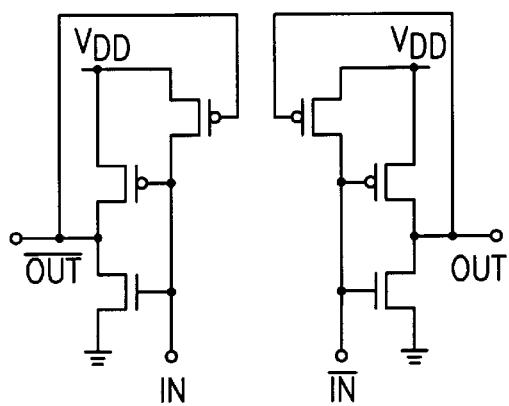
Figure 2D:
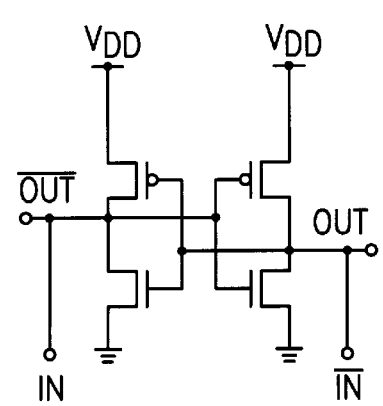
Figure 3:
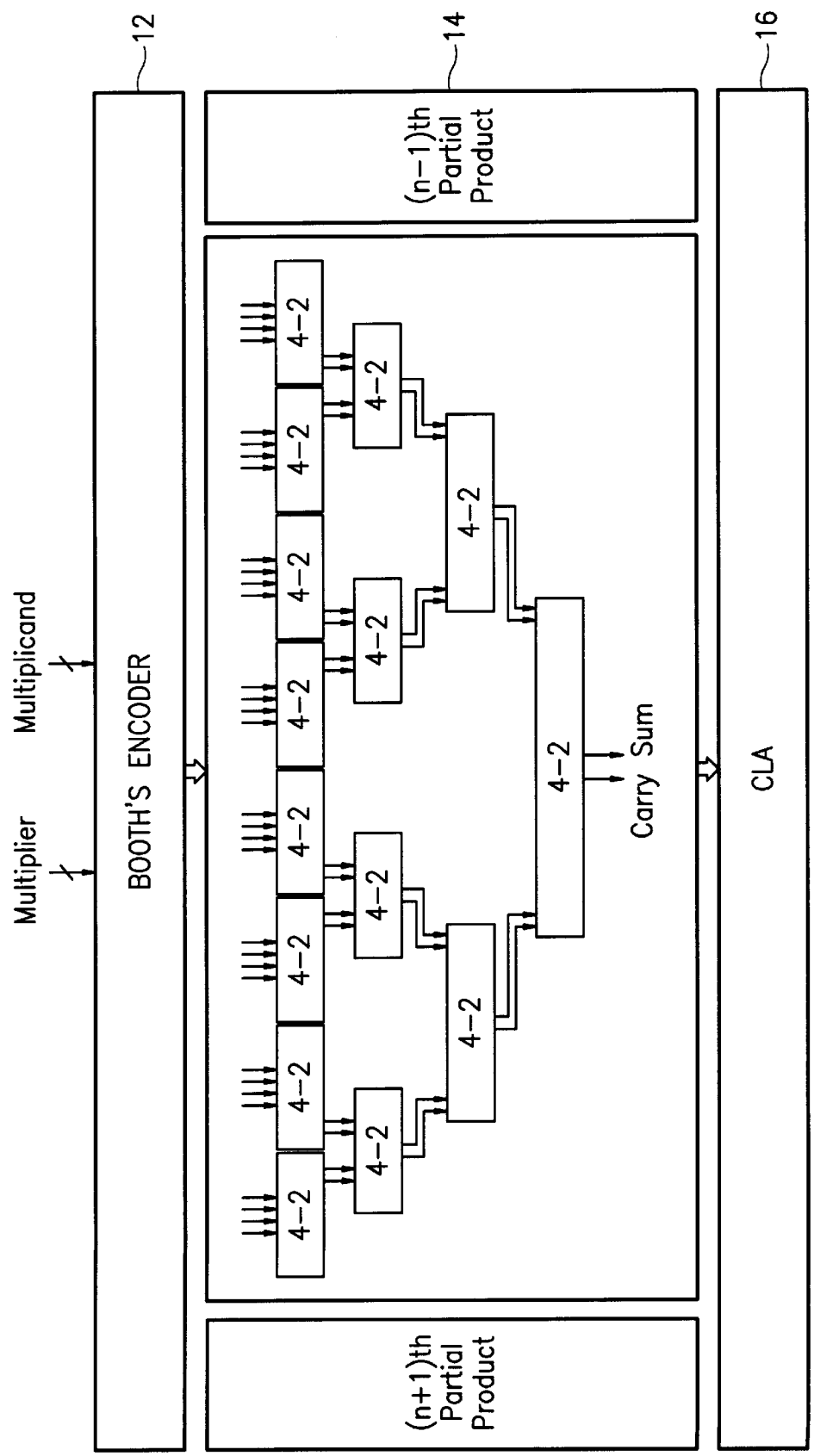
FIG. 3 is a block diagram of a (54×54)-bit multiplier in which a prior art 108-bit conditional sum adder using pass-transistor multiplexers is provided.
Figure 4A:
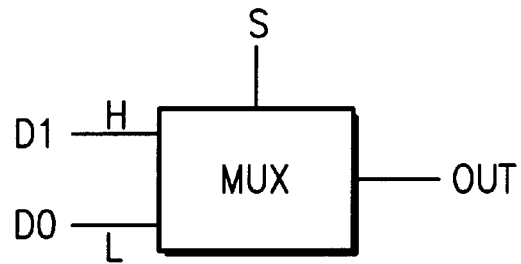
FIG. 4A is a block diagram of the pass-transistor multiplexer.
Figure 4B:
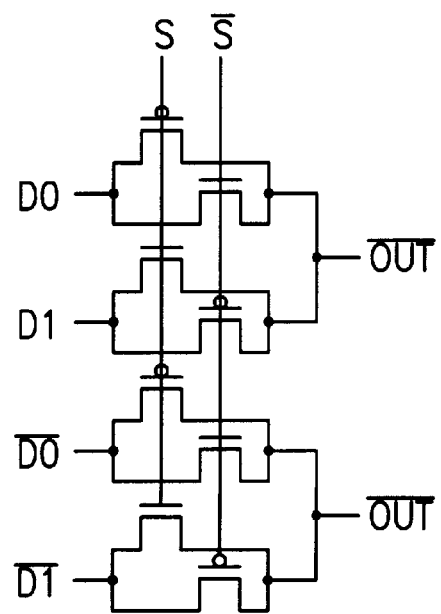
FIG. 4B is a circuit diagram of the pass-transistor multiplexer shown in FIG. 4A.
Figure 5A:
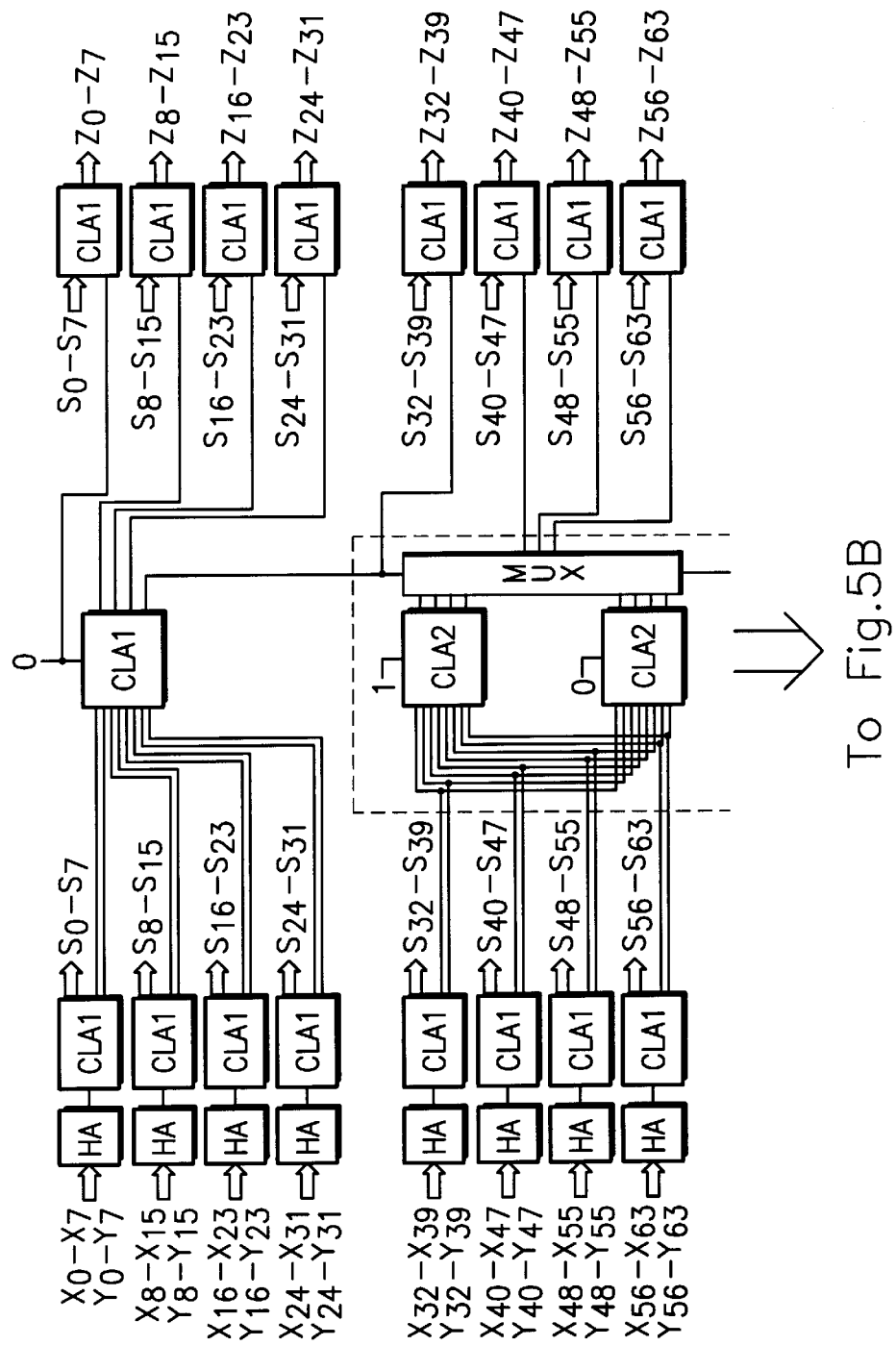
FIGS. 5A AND 5B are block diagrams showing the construction of the 108-bit conditional sum adder shown in FIG. 3.
Figure 5B:
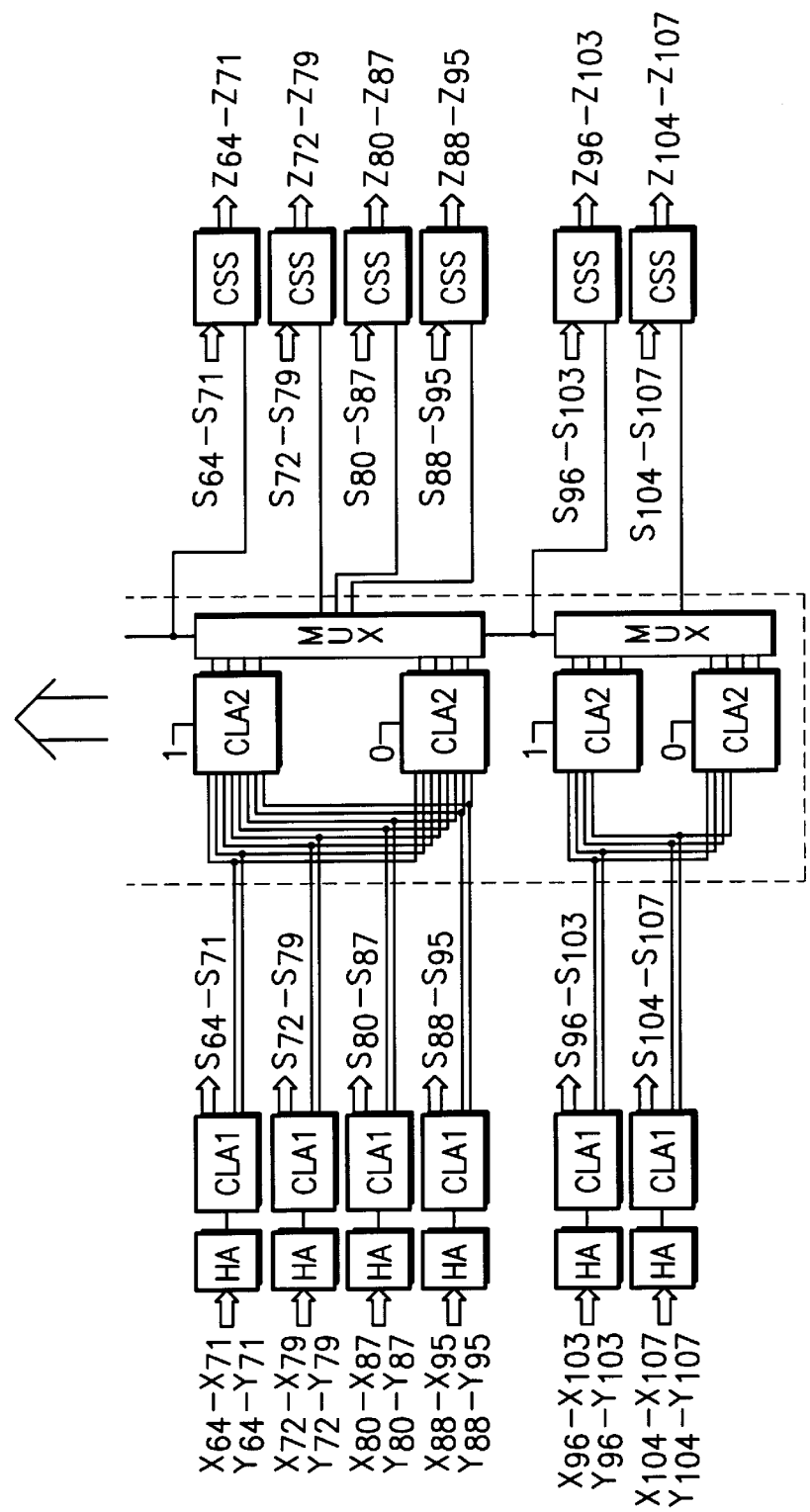
Figure 6:
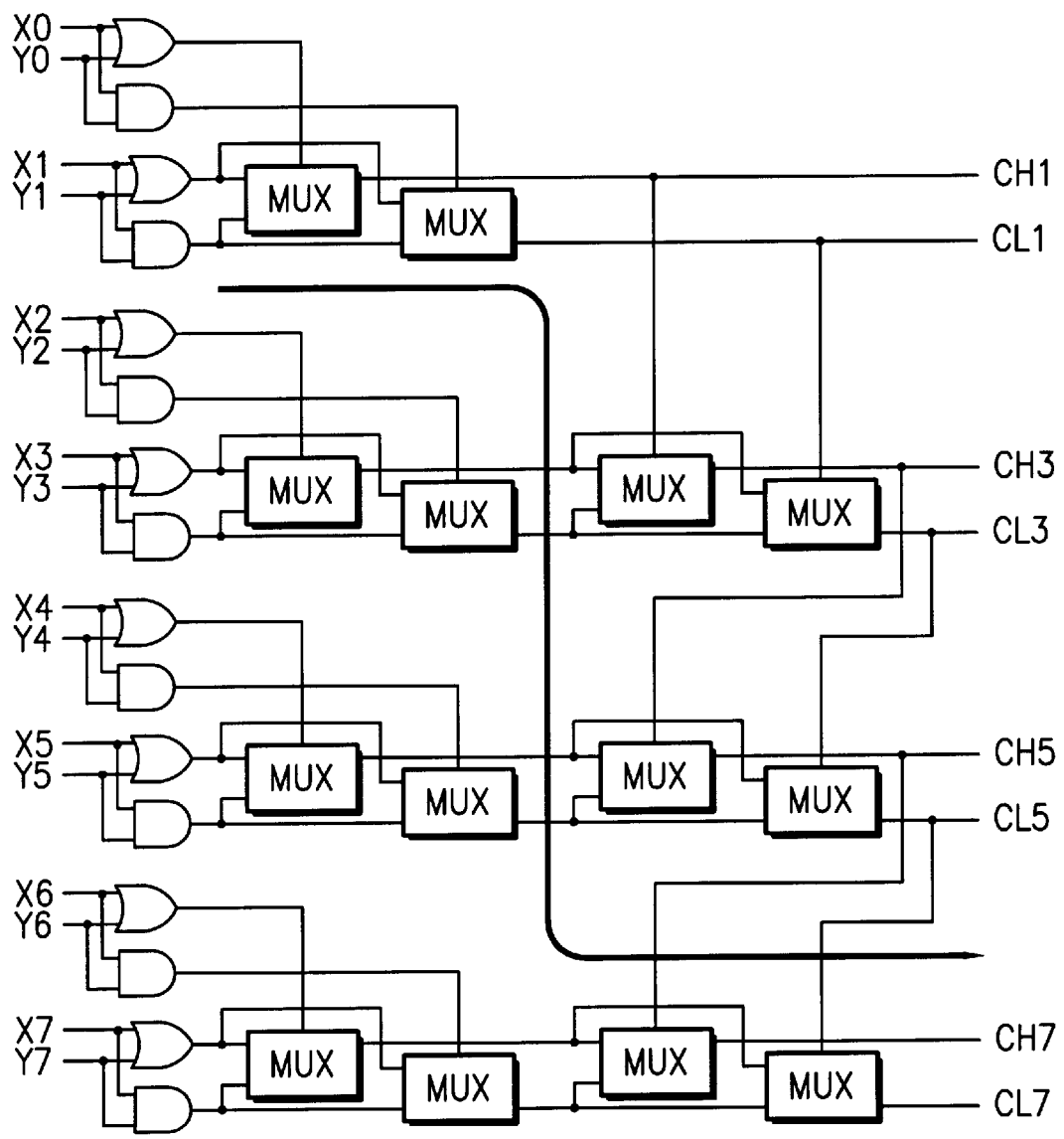
FIG. 6 is a block diagram showing the construction of an 8-bit conditional carry selection block consisting of the half-adder and first carry lookahead adder shown in FIGS. 5A and 5B.
Figure 7:
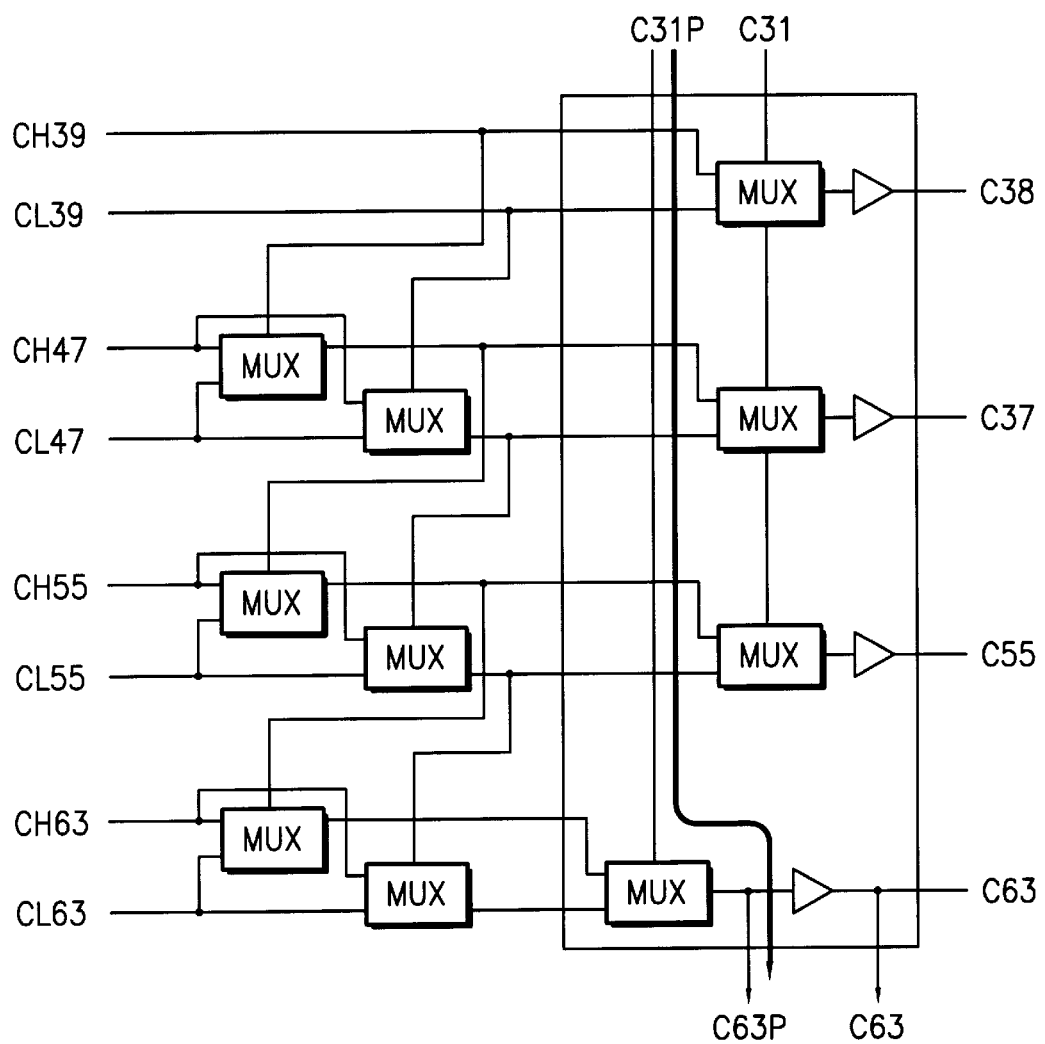
FIG. 7 is a block diagram showing the construction of the second carry lookahead adder shown in FIGS. 5A and 5B.

As shown in FIG. 8, since the level restoration circuit according to the present invention further has two PMOS transistors 94 and 96 forming the regenerative feedback generator 84, in comparison with the prior art level restoration circuit of FIG. 2A, there may be some increase in chip area. But the chip area of the level restoration circuit can be substantially reduced because the two PMOS transistors 94 and 96 are used for switching as further explained shortly.

According to the following Table 1, it can be seen that the layout size of the level restoration circuit is somewhat larger than that of the prior art CPL (complementary pass-transistor logic), and nearly the same as that of another prior art CPL2. Table 1 shows the characteristics of full adders with level restoration circuits in the prior art and the present invention, implemented using a 0.6 μm CMOS technique, a source power $V_{SS}$ of 3.3 V, and a load capacitance $C_L$ of 30 fF.

TABLE 1

| | Number of Transistors | Relative Chip Area | Delay [ns] | Power [mW/25 MHz] | Power × Delay [pJ] | Relative Energy Consumption | Area × Energy Consumption |
|---|---|---|---|---|---|---|---|
| CPL (m = 1) | 28 | 100 | 1.00 | 0.356 | 0.358 | 100.0 | 100.0 |
| CPL2 (m = 1) | 32 | 109 | 0.74 | 0.266 | 0.197 | 40.7 | 44.4 |
| Stand (m = 1) | 32 | 109 | 1.08 | 0.297 | 0.321 | 97.0 | 105.8 |
| SRPL m = 3 | 28 | 758 | 0.56 | 0.496 | 0.278 | 43.6 | 330.5 |
| EEPL (m = 1) | 32 | 109 | 0.85 | 0.233 | 0.198 | 46.9 | 51.1 |

In Table 1, m indicates the relative ratio of width (W)/length (L) of the NMOS functional block, m=1 representing 1.7/0.6 and m=3 representing 5.1/0.65.

Figure 9:
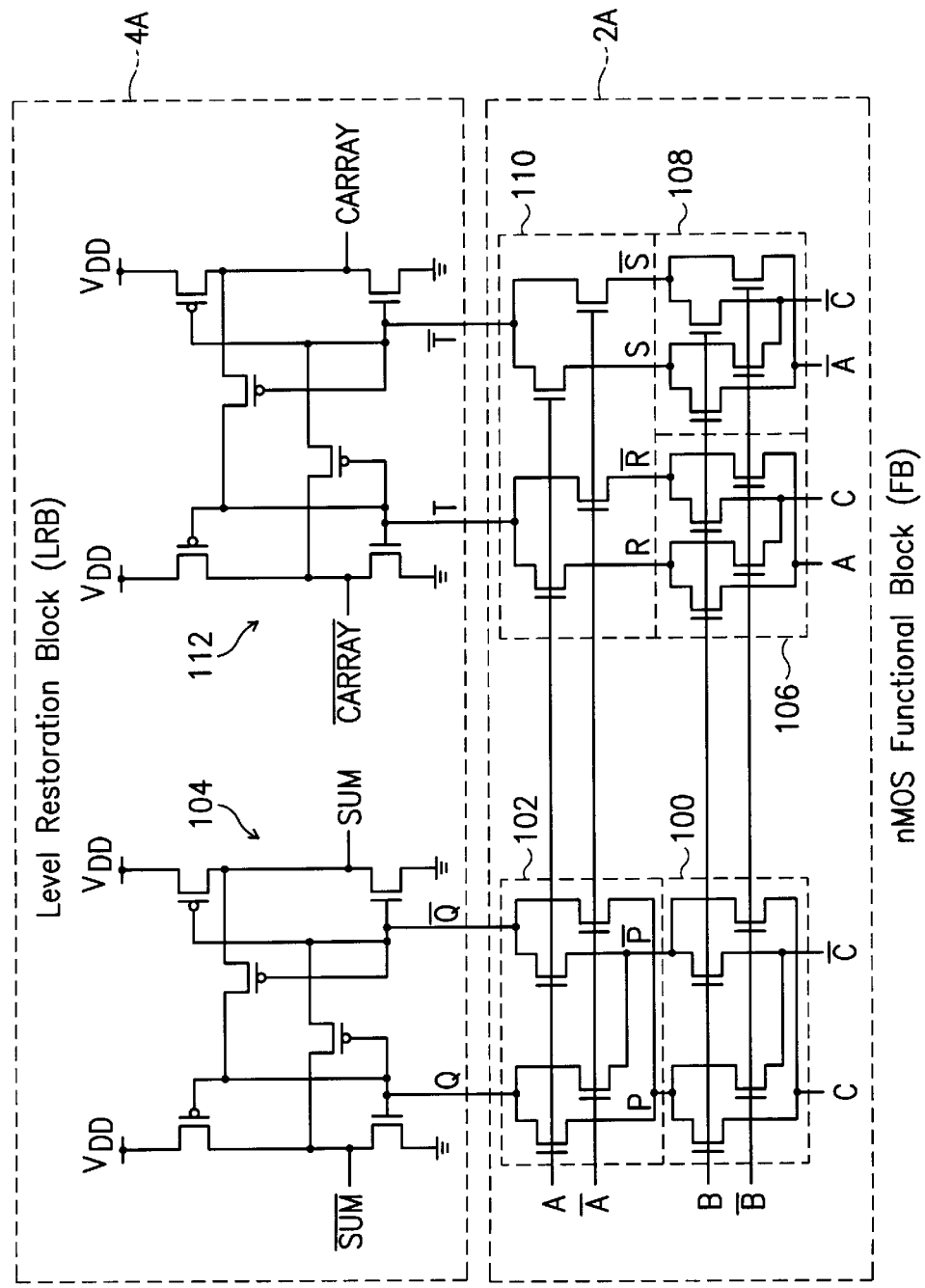
FIG. 9 is a circuit diagram showing the construction of a 1-bit full adder according to the present invention.

FIG. 9 shows a 1-bit full adder that has a level restoration block 4A and a functional block 2A according to the present invention. Of input signals A, B and C, A indicates the most significant bit (MSB) and C indicates the least significant bit (LSB). Two low-order bits of the input signals B and C, and complementary signals /B and /C respectively are provided to a first addition section 100 of the functional block 2A to be added. Partial sum signal P and complementary signal /P of the first addition section 100, as well as the MSB signal A and its complementary signal /A are provided to the second addition section 102 to be added. Sum signal Q and complementary signal /Q from the second addition section 102 are provided to an EEPL level restoration circuit 104 in the level restoration block 4A, and are restored to full levels by the EEPL level restoration circuit 104 to be outputted as a final sum signal SUM and a complementary signal /SUM thereof.

The input signals and the complementary signals thereof are also provided to third and fourth addition sections 106 and 108. A fifth addition section 110 performs the addition of a partial sum signal R and its complement, /R from the third addition section 106, the other partial sum signal S and its complement /S from the third addition section 108, and the MSB signal A and complementary /A to output a carry signal T and a complementary signal /T thereof.

The signals T and /T from the fifth addition section 110 are provided to the EEPL circuit 112 of the level restoration block 4A, and restored to full levels by the EEPL level restoration circuit 112 to be outputted as both a final carry signal CARRY and a complementary signal /CARRY thereof.

Figure 10A:
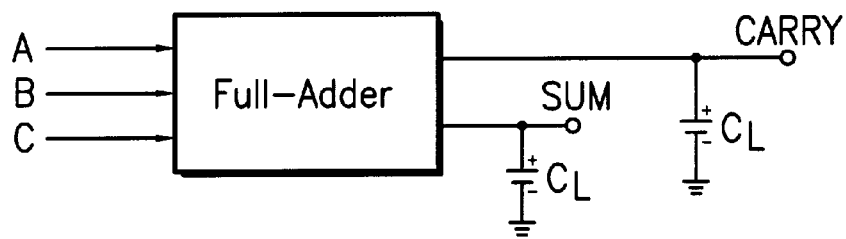
FIG. 10A is a block diagram showing an ideal simulation environment of the full adder.
Figure 10B:
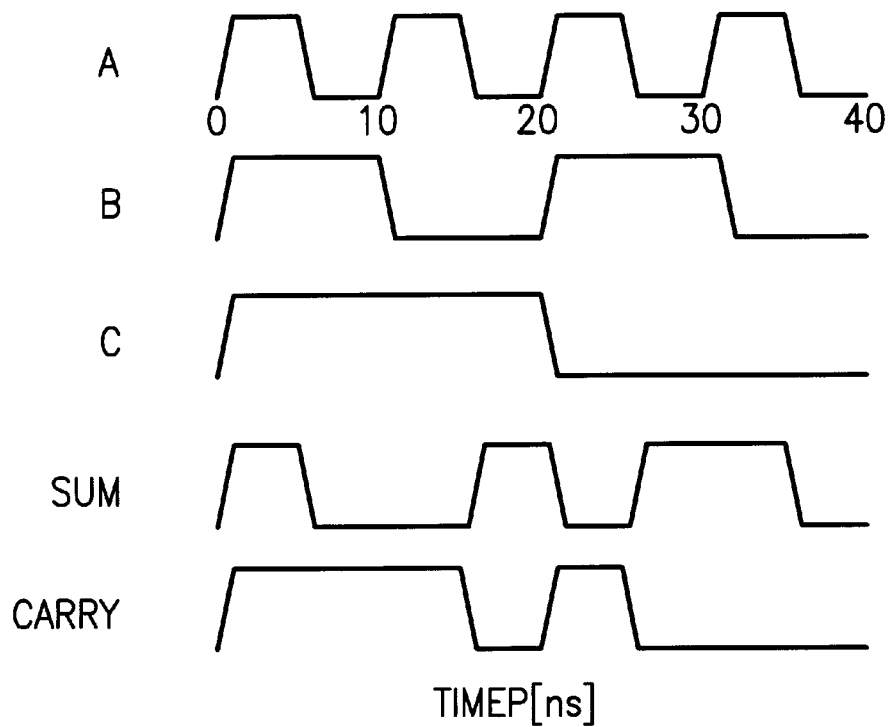
FIG. 10B is a waveform diagram of input and output signals of the full adder shown in FIG. 10A.

FIG. 10A shows an ideal simulation environment of the 1-bit fill adder shown in FIG. 9. In this 1-bit full adder, as power consumption (P×D) is increased, load capacitance is also increased. FIG. 10B is a waveform diagram of the input and output signals of the full adder shown in FIG. 10A. In FIGS. 10A and 10B, reference symbols A, B and C all indicate the input signals of the full adder. The reference symbol SUM indicates the sum signal and the reference symbol CARRY does the carry signal.

Figure 11:
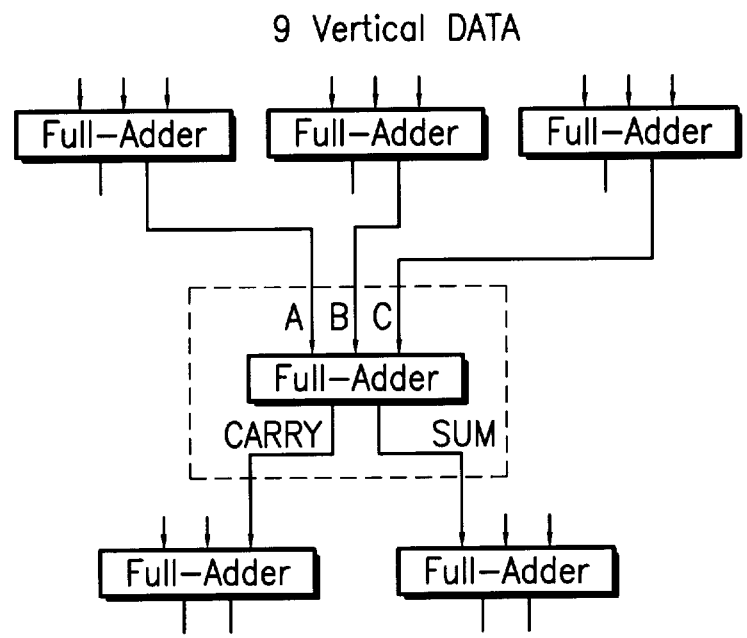
FIG. 11 is a block diagram showing the simulation environment of a cascade full adder chain.
Figure 12:
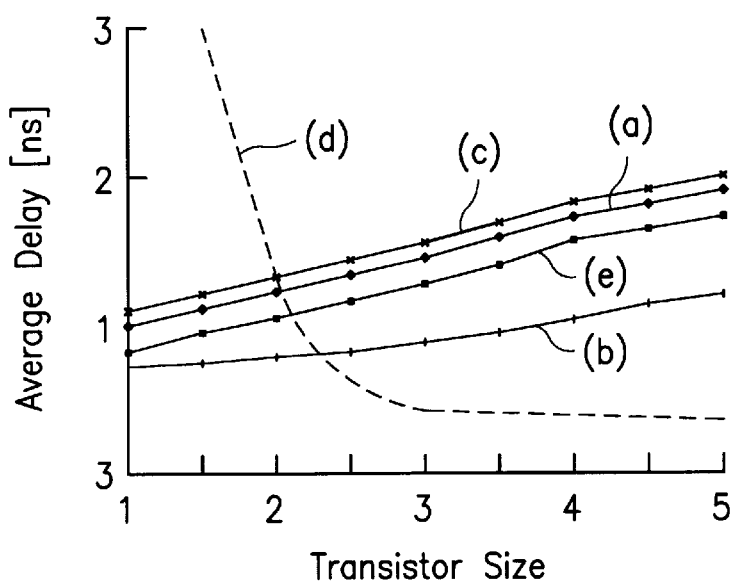
FIG. 12 is a graph diagram showing the average delay characteristic of respective pass-transistor logics in the full adder chain shown in FIG. 11.
Figure 13:
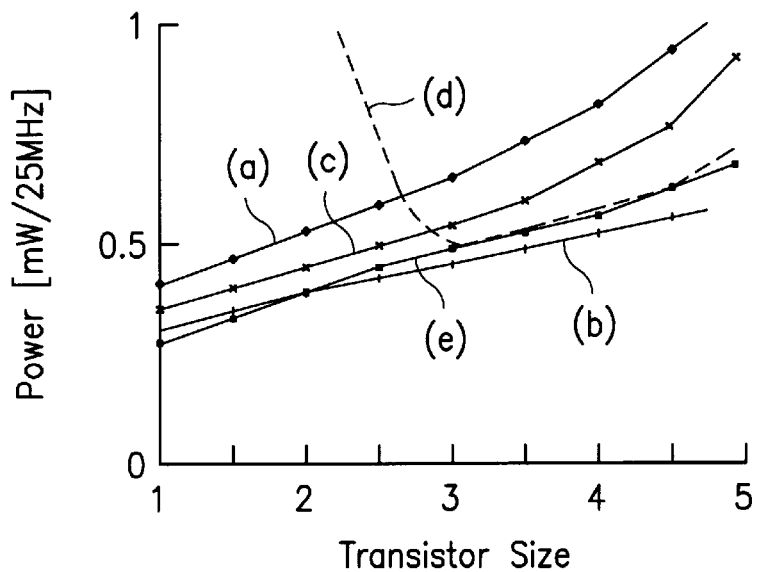
FIG. 13 is a graph diagram showing the power consumption characteristic of respective pass-transistor logics in the full adder chain shown in FIG. 11.

FIG. 11 shows the simulation environment of a cascade full adder chain. FIG. 12 presents a graph showing the average delay characteristic of the pass-transistor logic in the full adder chain shown in FIG. 11. FIG. 13 shows the power consumption characteristic of the pass-transistor logics in the full adder chain shown in FIG. 11.

Figure 15:
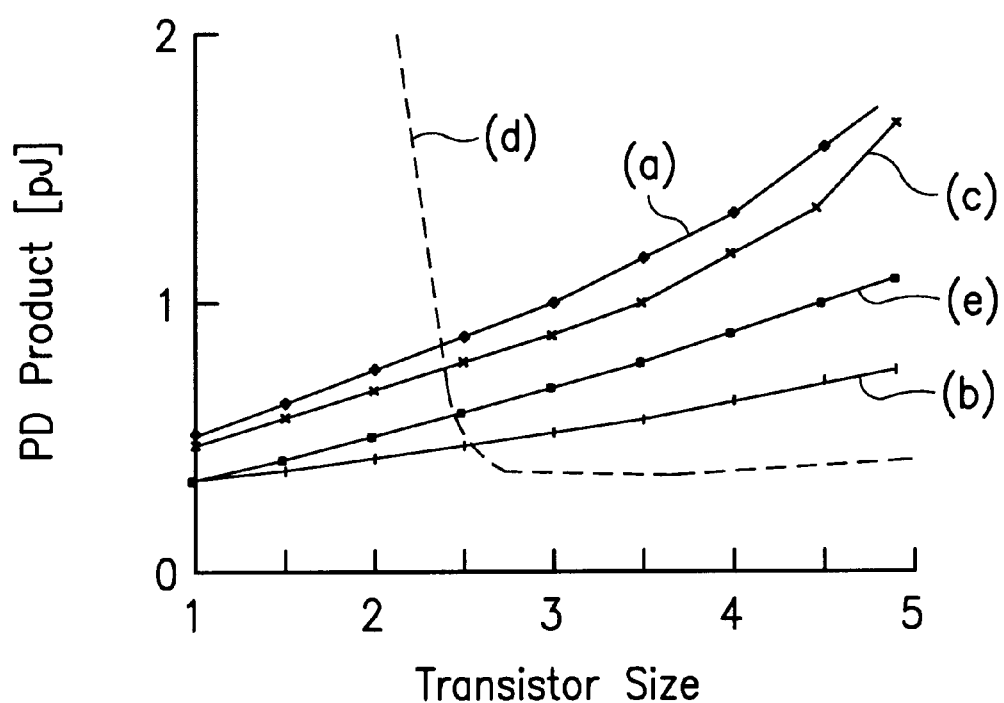
FIG. 15 is a graph diagram showing power (P)×delay (D) characteristic of the respective pass-transistor logics in the full adder chain shown in FIG. 11.

In FIGS. 12, 13 and 15, the x-axis indicates the relative ratio (m) of width (W)/length (L) of the function block, and reference symbols "(a)," "(b)," "(c)," "(d)," and "(e)" indicate level restoration circuits of types CPL, CPL2, Standalone, SRPL and EEPL of the present invention, respectively.

Figure 14:
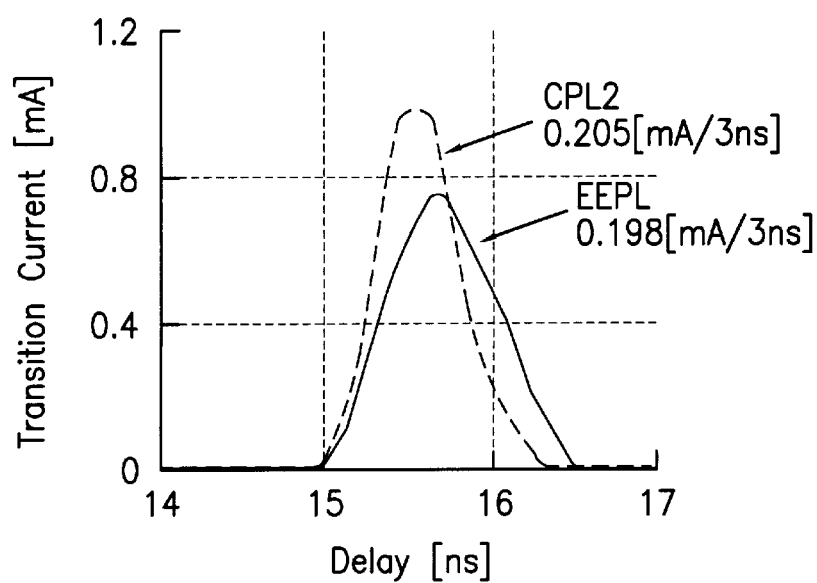
FIG. 14 is a graph diagram showing transition current processes of the pass-transistor logic of the prior art and the pass-transistor logics according to the present invention.

In FIG. 14, the transition current processes of the pass-transistor logic of the prior art and the pass-transistor logic according to the present invention are illustrated as curves. FIG. 15 is a graph diagram showing the power (P)×delay (D) characteristic of the respective pass-transistor logics in the full adder chain shown in FIG. 11.

It can be seen from FIG. 12 that the delay increases in proportion to the relative ratio of W/L, and that the delay of EEPL according to the present invention is less than that of CPL or SRPL. Also, it can be seen that the SRPL is not used when the W/L ratio is small, or when transistor size is small. The SRPL is normally used only when the circuit being fabricated is in proportion to three or four times the basic W/L ratio. Therefore, the SRPL structure is not preferable in light of the reduced of chip area.

Also, it can be seen from FIG. 13 that when the W/L ratio is low, the power dissipation of EEPL according to the present invention is less than that of CPL2. This is because the peak current of EEPL is less than that of CPL2, as shown in FIG. 14.

From FIG. 15, it can be seen that the power (P)×delay (D) characteristic of EEPL is somewhat larger than that of than CPL2, despite its superior performance relative to CPL or SRPL. Also, the relative energy consumption of EEPL is somewhat larger than that of CPL2, but has superior characteristics to CPL2 in light of power.

Figure 16:
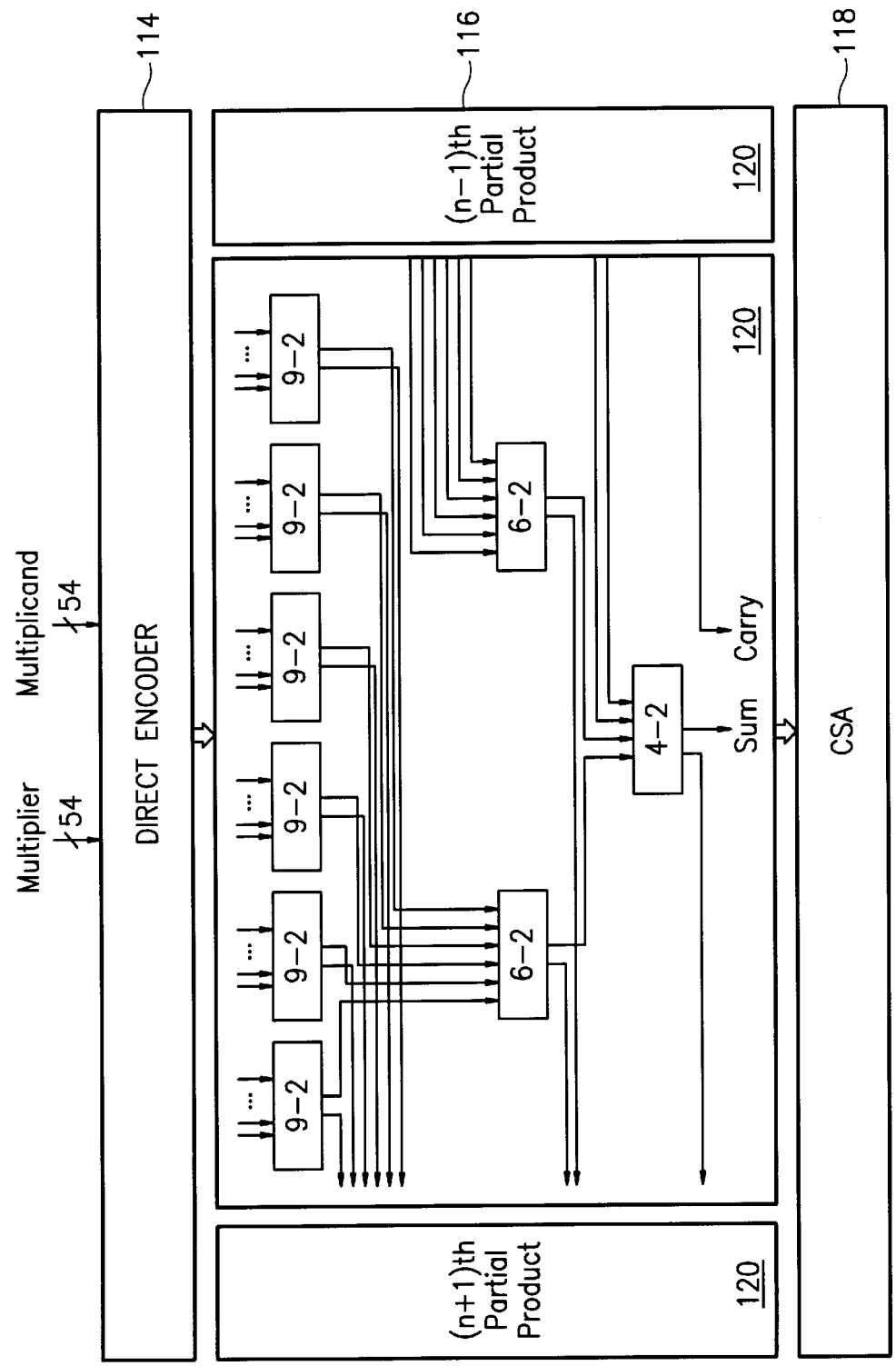
FIG. 16 is a block diagram of a (54×54)-bit multiplier in which the 108-bit conditional sum adder according to the present invention can be provided.

FIG. 16 shows a (54×54)-bit multiplier according to the present invention. Referring to FIG. 16, the (54×54)-bit multiplier uses a direct encoder 114 for producing fifty-four vertical data signals, each of which has fifty-four bits, a Wallace tree compressor 116 for compressing each 54-bit vertical data signal into a 2-bit signal (for example, a carry signal and a sum signal), and a 108-bit conditional sum adder 118 for generating a multiplication result by adding the sum signals, while propagating the carry signals.

The encoder 114 which constitutes a plurality of multiplexers is designed to receive a 54-bit multiplier signal and a 54-bit multiplicand signal, and to produce the fifty-four 54-bit vertical data signals. In the encoder 114, if a bit value of the 54-bit multiplicand signal is "1," a bit value of the 54-bit multiplier is directly outputted. If the bit value of the 54-bit multiplicand signal is "0," a bit value is set to "0" to be outputted. The n-th vertical data signal becomes equal to a partial product of the 54-bit multiplier signal and the n-th bit value of the 54-bit multiplicand signal, where n is 1, 2, . . . , 54. Consequently, fifty-four partial products, corresponding to the multiplicand signal from MSB to LSB, are produced as the fifty-four vertical data signals. Table 2 illustrates the production of the vertical data signals in case of a (4×4) multiplier.

TABLE 2

| | |
|---|---|
| 1001 | . . . Multiplier |
| × 1101 | . . . Multiplicand |
| 1101 | . . . 1st vertical data signal |
| 0000 | . . . 2nd vertical data signal |
| 0000 | . . . 3rd vertical data signal |
| 1101 | . . . 4th vertical data signal |

As depicted by Table 2, if the 4-bit multiplier data "1101" is multiplied by the 4-bit multiplicand data "1001," the first to fourth vertical data signals produced are "1101," "0000," "0000," and "1101," in accordance with respective bit values of the multiplicand data. The first and fourth vertical data signals, whose bit values are "1," have the same data as the multiplier data "1101." The second and third vertical data signals whose bit values are "0," have "0000." All the vertical data signals are provided to the Wallace tree compressor 116.

Figure 20:
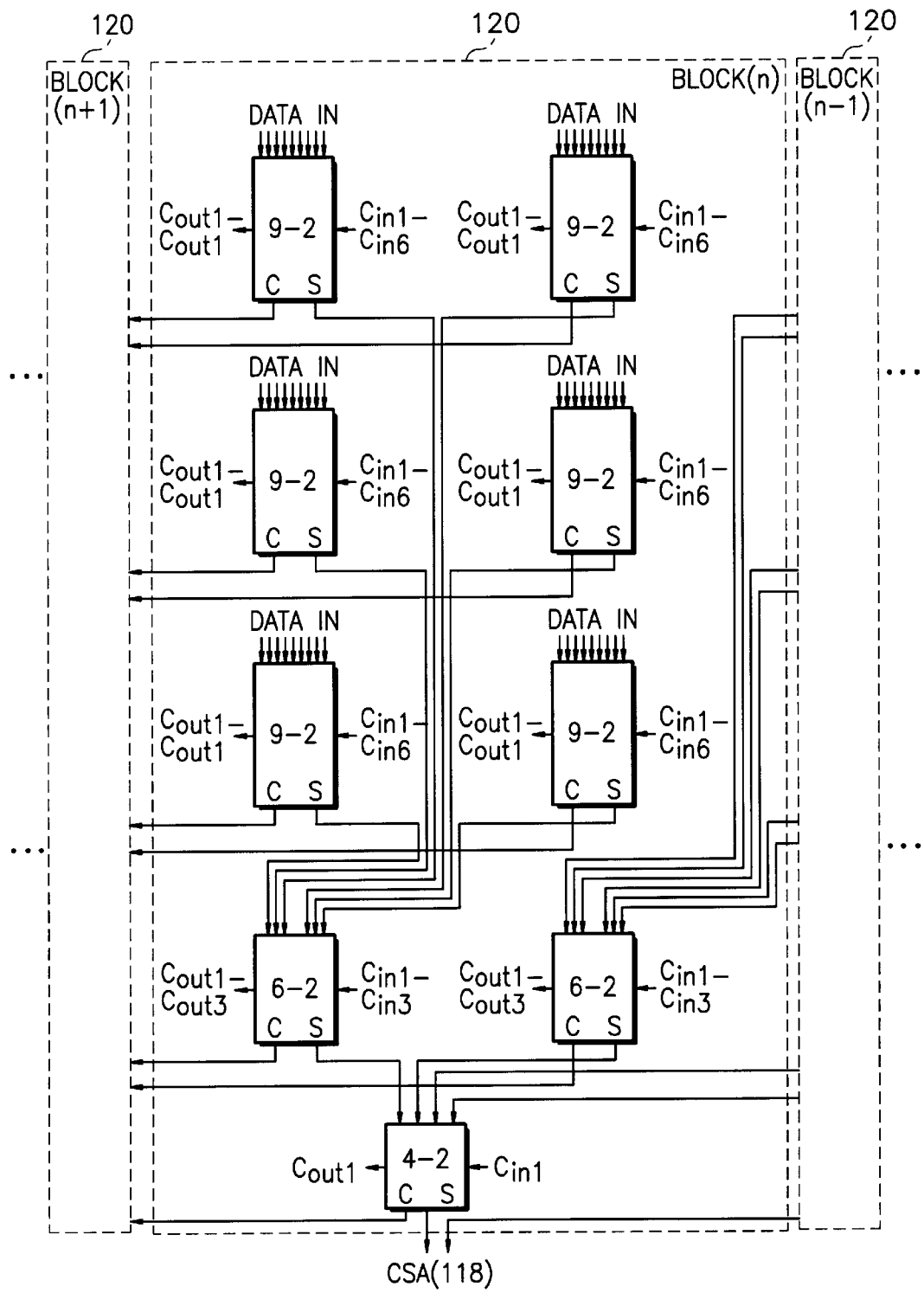
FIG. 20 is a circuit diagram of the compression unit shown in FIG. 16.

Turning again to FIG. 16, the Wallace tree compressor 116 comprises fifty-four compression units 120, corresponding to the fifty-four vertical data signals. Each compression unit has six 9-to-2 compressors, two 6-to-2 compressors and one 4-to-2 compressor. The 54-bit vertical signal from the encoder 114 is divided into 9-bit signals to be provided to the six 9-to-2 compressors. Each 9-to-2 compressor compresses its 9-bit signal into a 2-bit signal, i.e. carry and sum signals. The carry signals from the 9-to-2 compressors are passed to the next stage compression unit. The first 6-to-2 compressor receives the sum signals from the six 9-to-2 compressors; the second 6-to-2 compressor receives the carry signals from the six 9-to-2 compressors of the previous stage compression unit. The carry signals from the 6-to-2 compressors are passed to the next stage compression unit. The 4-to-2 compressor receives the sum signals from the two 6-to-2 compressors and the carry signals from the two 6-to-2 compressors of the previous stage compression unit. With this construction of the Wallace tree compressor 116, a single compressor produces two bits of data, i.e. a carry and a sum signal, and thus the compressor 116 can produce a 108-bit data signal. The 108-bit data signal from the Wallace tree compressor 116 is provided to the 108-bit conditional sum adder 118. FIG. 20 illustrates an example of the compression unit 120.

As described above, the 108-bit carry and sum signals from the fifty-four compression units related to the fifty-four vertical data signals have the same delay time and are provided to the conditional sum adder 118. As a result, a (54×54)-bit multiplication data is finally produced by the conditional sum adder 118.

Figure 17:
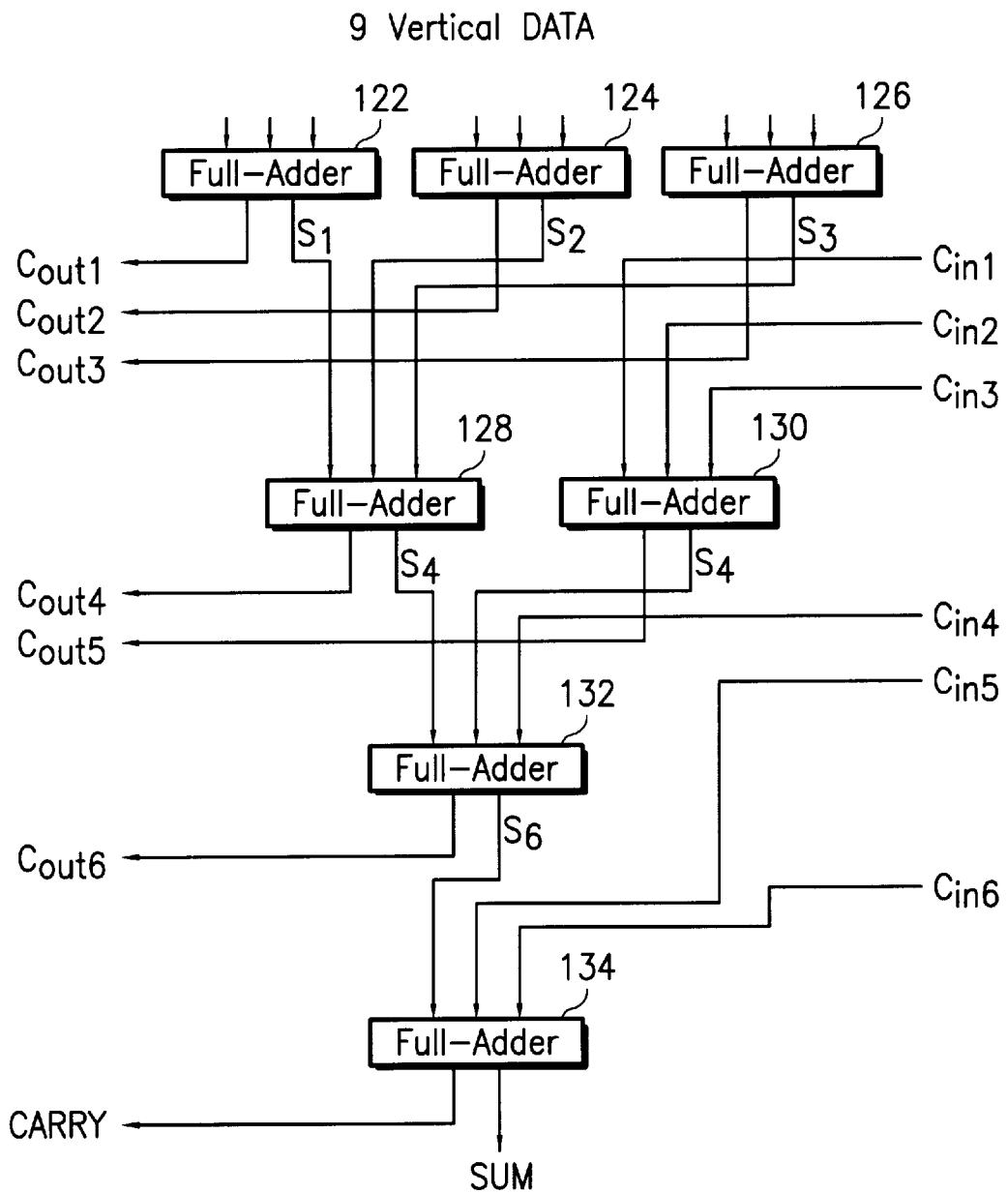
FIG. 17 is a block diagram of the 9-to-2 compressor shown in FIG. 16.

FIG. 17 shows one of the 9-to-2 compressors of FIG. 16. Each 9-to-2 compressor has seven full adders 122, 124, 126, 128, 130, 132, and 134, each of which has the same construction as the full adder of FIG. 9. The 9-to-2 compressor receives 9 of the 54 bits vertical data provided from the encoder 114 and a six bit carry signal $C_{in1}$–$C_{in6}$ provided from a 9-to-2 compressor of the (n−1)-th compression unit, and produces a carry bit signal CARRY, a sum bit signal SUM and the other carry bit signals $C_{out1}$–$C_{out6}$ to be provided to a 9-to-2 compressor of the (n+1)-th compression unit.

As shown in FIG. 17, the 9-bit vertical data signal from the encoder 114 is divided into 3-bit signals, which are respectively provided to the first three full adders 122, 124 and 126. These full adders then produce three sum bit signals $S_1$–$S_3$ and three carry bit signals $C_{out1}$–$C_{out3}$ to be provided to a 9-to-2 compressor of the next stage compression unit, i.e. the (n+1)-th compression unit. The fourth full adder 128 receives the three sum bit signals $S_1$–$S_3$ and produces a fourth sum bit signal $S_4$ and a fourth carry bit signal $C_{out4}$, the latter of which is a 9-to-2 compressor in the (n+1)-th compression unit. The fifth full adder 130 receives the first three carry bit signals $C_{in1}$–$C_{in3}$ from a 9-to-2 compressor in the (n−1)-th compression unit, and produces a fifth sum bit signal $S_5$ and a fifth carry bit signal $C_{out5}$, the latter of which is provided to the a 9-to-2 compressor in the (n+1)-th compression unit. The sixth full adder 132 receives the fourth and fifth sum bit signals $S_4$ and $S_5$ and the fifth carry bit signal $C_{in4}$ from a 9-to-2 compressor of the (n−1)-th compression unit and produces a sixth sum bit signal $S_6$ and a sixth carry bit signal $C_{out6}$, the latter of which is provided to a 9-to-2 compressor of the (n+1)-th compression unit. The seventh full adder 134 receives the sixth sum bit signal $S_6$ from the sixth full adder and the fifth and sixth carry bit signals $C_{in5}$ and $C_{in6}$ from the a 9-to-2 compressor of the (n−1)-th compression unit and produces the sum bit signal SUM and the carry bit signal CARRY.

Figure 18:
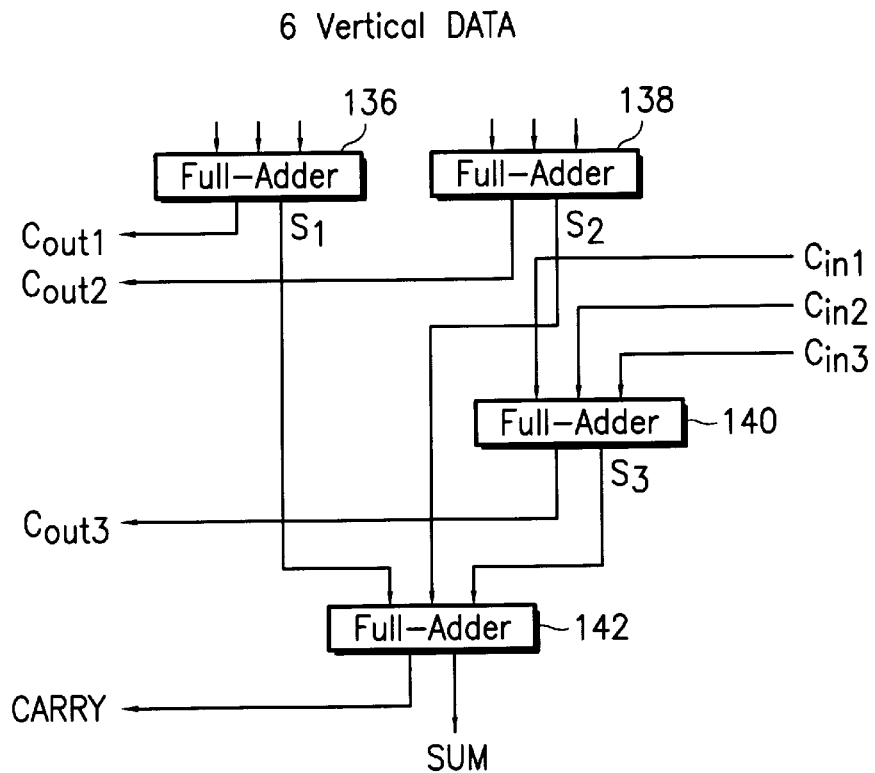
FIG. 18 is a block diagram of the 6-to-2 compressor shown in FIG. 16.

FIG. 18 shows one of the two 6-to-2 compressors of FIG. 16. Each 6-to-2 compressor has four full adders 136, 138, 140 and 142, each of which has the same construction as the full adder of FIG. 9. Each 6-to-2 compressor receives 6 of the 12 bits of vertical data signal from the six 9-to-2 compressors and a 3-bit carry signal $C_{in1}$–$C_{in3}$ from a 6-to-2 compressor of the pre-stage compressor unit, i.e. the (n−1)-th compression unit, and generates the carry bit signal CARRY, the sum bit signal SUM and the other carry bit signals $C_{out1}$–$C_{out3}$ to be provided to a corresponding 6-to-2 compressor of the (n+1)-th compression unit.

Referring again to FIG. 18, the 6-bit vertical data signal from three 9-to-2 compressors is divided into 3-bit signals to be provided to the first and second full adders 136 and 138. These full adders 136 and 138 then produce first and second sum bit signals $S_1$ and $S_2$ as well as first and second carry bit signals $C_{out1}$ and $C_{out2}$ to be provided to a 6-to-2 compressor of the (n+1)-th compression unit. The third full adder 140 receives the three carry bit signals $C_{in1}$–$C_{in3}$ from a 6-to-2 compressor of the (n−1)-th compression unit, and produces a third sum bit signal $S_3$ and a third carry bit signal $C_{out3}$ to be provided to a 6-to-2 compressor of the (n+1)-th compression unit. The fourth full adder 142 receives the three sum bit signals $S_1$–$S_3$ from the first three full adders and finally produces the sum bit signal SUM and the carry bit signal CARRY.

Figure 19:
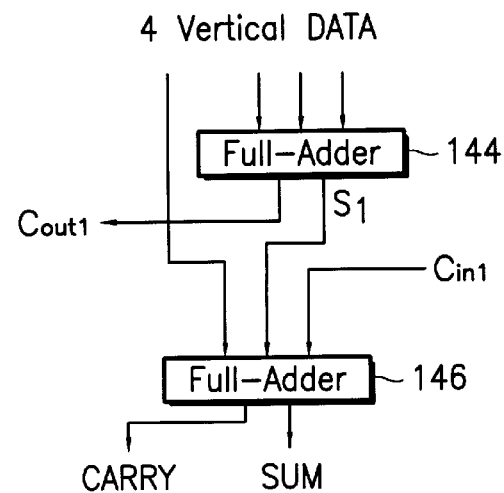
FIG. 19 is a block diagram of the 4-to-2 compressor shown in FIG. 16.

FIG. 19 shows the 4-to-2 compressor of FIG. 16. Each 4-to-2 compressor has two full adders 144 and 146, each of which has the same construction as the full adder of FIG. 9. The 4-to-2 compressor receives a 4-bit vertical data signal from the two 6-to-2 compressors and a 1-bit carry signal $C_{in1}$ from a corresponding 4-to-2 compressor of the (n−1)-th compression unit, and generates the carry bit signal CARRY, the sum bit signal SUM and the other carry bit signal $C_{out1}$ to be provided to a 4-to-2 compressor of the (n+1)-th compression unit.

Referring again to FIG. 19, the low-order 3-bit signal of the 4-bit vertical data signal from the two 6-to-2 compressors is provided to the first full adder 144 which produces a first sum bit signal $S_1$ and carry bit signal $C_{out1}$, the latter of which is provided to the 4-to-2 compressor of the (n+1)-th compression unit. The second full adder 140 receives the MSB of the 4-bit vertical data signal, the sum bit signal $S_1$ from the first full adder 144 and the carry bit signal $C_{in1}$ from the 4-to-2 compressor of the (n−1)-th compression unit, and produces final sum and carry bit signals SUM and CARRY. The sum and carry bit signals produced thus are supplied to the 108-bit conditional sum adder 116, as shown in FIG. 16.

Figure 21:
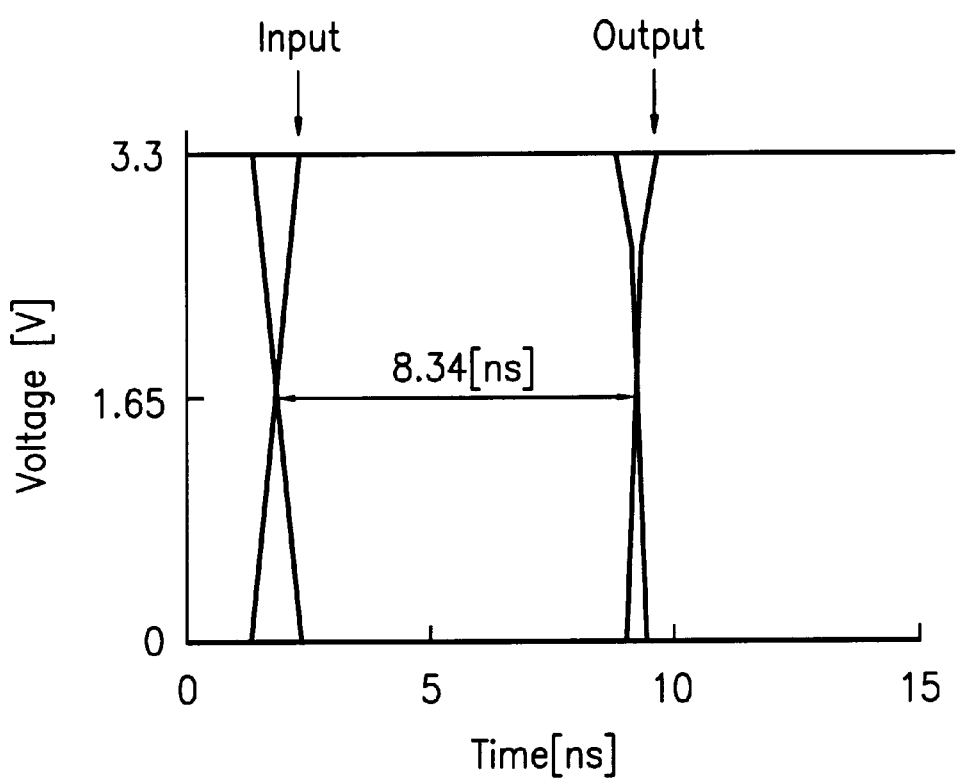
FIG. 21 is a diagram showing simulation results of a threshold path in the compression unit shown in FIG. 20.

FIG. 21 shows the simulation results of a threshold path in the compression unit according to the present invention. From FIG. 21, it can be seen that approximately 8.34 nanoseconds are required to calculate an output.

Figure 22:
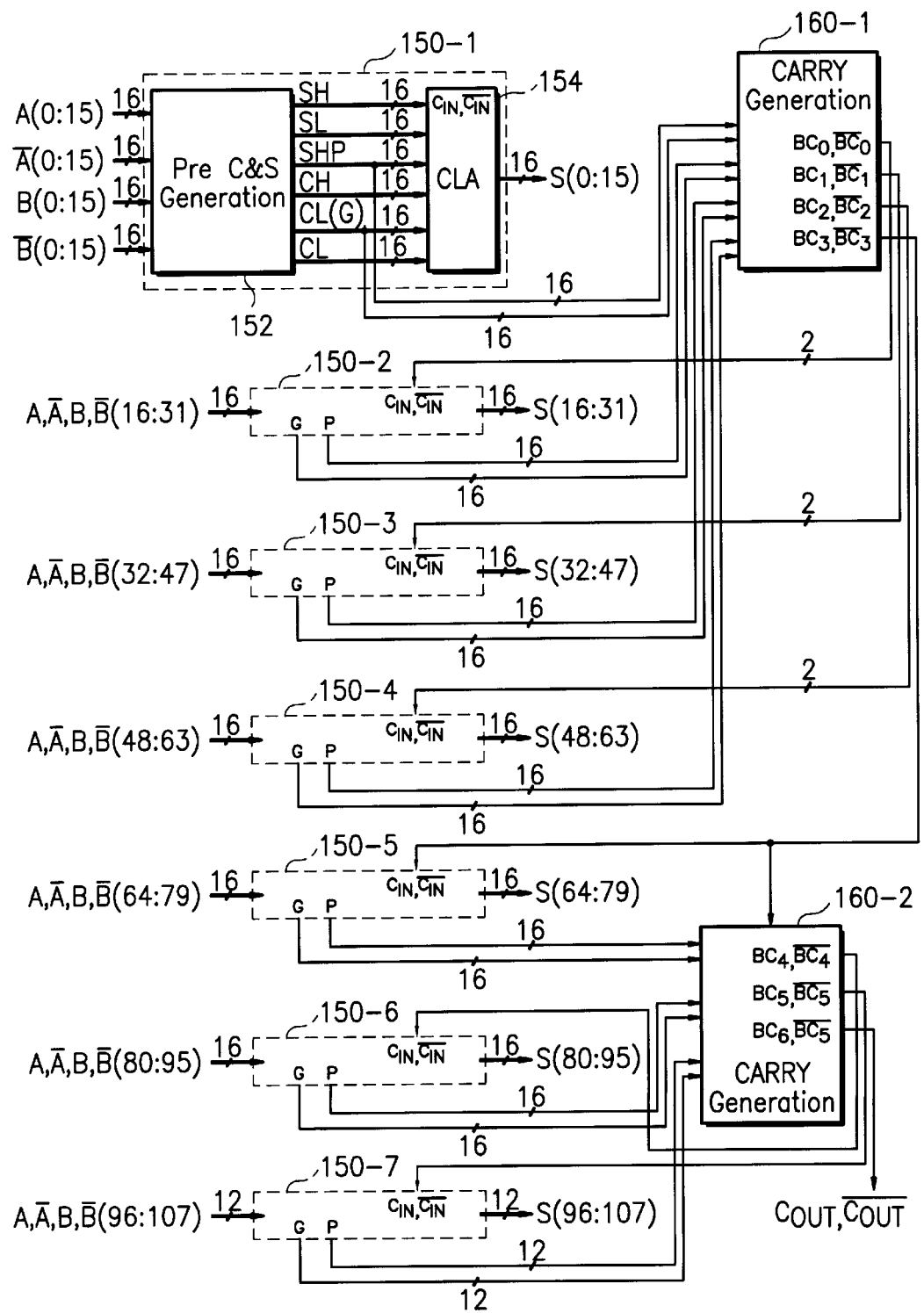
FIG. 22 is a block diagram of the 108-bit conditional sum adder circuit of FIG. 16 according to a preferred embodiment of the present invention.

FIG. 22 shows the 108-bit conditional sum adder circuit of FIG. 16 according to a preferred embodiment of the present invention. The 108-bit conditional sum adder 118 comprises seven moduled 16-bit sum generation blocks 150-1, 150-2, 150-3, 150-4, 150-5, 150-6, and 150-7, and two 4-bit carry generation blocks 160-1 and 160-2. The number of carry generation blocks is equal to the ceiling value of the number of sum generation blocks, divided by the number of carry bits generated by each carry generation block, i.e. $\lceil 7/4 \rceil = 2$. Each of the sum generation blocks 150-1–150-7 has a pre-carry and pre-sum generator 152 and a 16-bit conditional sum adder 154. The sum generation blocks use EEPL and the carry generation blocks use CMOS logic.

In the preferred embodiment, the most significant feature of the 108-bit conditional sum adder is that the final stage is driven by block carry signals $BC_i$ and $/BC_i$ provided from the respective carry generation blocks 160-1 and 160-2. This occurs before carry propagation arrives at the final stage of the multiplexer chain, the carry propagation moving through sum generation blocks 150-1–150-7. In other words, carry propagation and sum generation occur individually in the conditional sum adder 118 according to the present invention. In contrast, carry generation and sum generation occur simultaneously in the prior art conditional sum adder. Therefore, the conditional sum adder 118 of FIG. 22 can improve its operational speed, specifically, reducing delay time by approximately $2t_{MUX}$ in comparison with the prior art conditional sum adder.

Further, since the sum generation blocks comprise pass-transistor logic and the carry generation blocks comprise CMOS logic, the 108-bit conditional sum adder 118 has a faster operational speed and a lower power dissipation as compared with the prior art conditional sum adder using either the pass-transistor logic or the CMOS logic.

Returning to FIG. 22, the respective pre-carry and pre-sum generators 152 in the first to sixth sum generation blocks 150-1–150-6 receive a first 16-bit input signal $A_i$–$A_{i+15}$ (where "i" is equal to 0, 16, 32, ..., 80), a complementary signal $/A_i$–$/A_{i+15}$ to the first 16-bit input signal, a second 16-bit input signal $B_i$–$B_{i+15}$ and a complementary signal $/B_i$–$/B_{i+15}$ to the second 16-bit input signal, and generate a first 16-bit conditional sum signal SH, a second 16-bit conditional sum signal SL, a first 16-bit conditional carry signal CH (or P), a complementary signal /CH to the first 16-bit conditional sum signal SH, a second 16-bit conditional carry signal CL (or G), and a complementary signal /CL to the second 16-bit conditional carry signal. The pre-carry and pre-sum generator 152 in the seventh sum generation block receives a first 12-bit input signal $A_{96}$–$A_{107}$, a complementary signal $A_{96}$–$A_{107}$ to the first 12-bit input signal, a second 12-bit input signal $B_{96}$–$B_{107}$ and a complementary signal $B_{96}$–$B_{107}$ to the second 16-bit input signal, and generates a first 12-bit conditional sum signal SH, a second 12-bit conditional sum signal SL, a first 12-bit conditional carry signal CH (or P), a complementary signal /CH to the first 12-bit conditional carry signal CH, a second 12-bit conditional carry signal CL (or G), and a complementary signal /CL to the second 12-bit conditional carry signal.

In each of the first seven sum generation blocks 150-1–150-7, the conditional sum adder 154 receives several signals from the pre-carry and pre-sum generator 152, i.e. the first conditional sum signal SH, the second conditional sum signal SL, the first conditional carry signal P, the complementary signal /CH to the first conditional sum signal SH, the second conditional carry signal CL, and the complementary signal /CL of the second conditional carry signal.

The 16-bit conditional sum adders of the first to sixth sum generation blocks 150-1–150-6 each generate a first to sixth 16-bit sum signals $S_i$–$S_{i+15}$ (where "i" is 0, 16, 32, ..., 80). The seventh 16-bit conditional sum adder of the seventh sum generation block 150-7 generates a seventh 12-bit sum signal $S_{96}$–$S_{107}$.

Further, in the first four sum generation blocks 150-1–150-4, the first and second conditional carry signals CH and CL from the pre-carry and pre-sum generators 154 are applied to the first carry generation block 160-1. In the fifth to seventh sum generation blocks 150-5–150-7, the first and second conditional carry signals CH and CL from the pre-carry and pre-sum generators 154 are applied to the second carry generation block 160-2. The first and second conditional carry signals CH and CL indicate carry propagation and carry generation signals, respectively.

The first carry generation block 160-1 generates first four block carry signals $BC_0$–$BC_3$ and complementary signals /$BC_0$–/$BC_3$. First block carry signal $BC_0$ and the complimentary signal /$BC_0$ are provided to the second sum generation block 150-2. Second block carry signal $BC_1$ and the complementary signal /$BC_1$ are provided to the third sum generation block 150-3. Third block carry signal $BC_2$ and the complementary signal /$BC_2$ are provided to the fourth sum generation block 150-4. Fourth block carry signal $BC_3$ and the complementary signal $BC_3$ are provided to the fifth sum generation block 150-5 and the second carry generation block 160-2. Each of the block carry signals is a 1-bit signal.

The second generation block 160-2 generates the fifth to seventh block carry signals $BC_4$–$BC_6$ and the complementary signals /$BC_4$–/$BC_6$. The fifth block carry signal $BC_4$ and the complementary signal /$BC_4$ thereof are supplied to the sixth sum generation block 150-6. The sixth block carry signal $BC_5$ and the complementary signal /$BC_5$ are supplied to the seventh sum generation block 150-7. And, the seventh block carry signal $BC_6$ and the complementary signal /$BC_6$ are generated as the final carry and complementary signals $C_{out}$ and /$C_{out}$, respectively.

As described above, the 108-bit conditional sum adder according to the present invention deals with the carry generation and the sum generation separately, so that the operational speed can be increased. That is, the delay time of the sum generation block is $10t_{MUX}$ which comprises $t_{MUX}$ due to the pre-carry and pre-sum generator 152, $8t_{MUX}$ due to the 16-bit conditional sum adder 154, and $t_{MUX}$ due to the block carry signals $BC_i$ and /$BC_i$ (or $C_{IN}$ and /$C_{IN}$) from the carry generation blocks 160-1 or 160-2. However long the delay time is due to the carry generation blocks 160-1 and 160-2, it does not exceed $8t_{MUX}$. The delay time due to the carry generation block is short in comparison with that of the sum generation block. Accordingly, the carry propagation time is faster than the sum propagation time so that addition speed is performed relatively fast.

In addition, the 108-bit conditional sum adder has seven sum generation blocks 150-1–150-7, i.e. seven 16-bit conditional sum adders. This (7×16) adder structure has a faster delay time than a prior art (8×14), (12×9), or (29×6) adder structure. As an example, in the case of the (8×14) adder structure, the delay time of the sum generation block is $5t_{MUX}$ comprising $t_{MUX}$ due to the pre-carry and pre-sum generator and $4t_{MUX}$ due to the sum generator (where $t_{MUX}$ is a delay time due to one multiplexer). The delay time due to the carry generation block is about $12t_{MUX}$ even though the block is implemented with group carry and group sum methods. Thus, the 108-bit conditional sum adder having a prior art (8×14) adder structure has at least $12t_{MUX}$ of delay time. The delay times of the respective adder structures are illustrated by the following Table 3.

TABLE 3

| Adder Structure | Delay Time of Sum Generation Block ($t_{MUX}$) | Delay Time of Carry Generation Block ($t_{MUX}$) | Total Delay Time ($t_{MUX}$) |
|---|---|---|---|
| 8 × 14 | 5 | 11 | 12 |
| 12 × 9 | 7 | 10 | 11 |
| 7 × 16 | 9 | 9 | 10 |
| 20 × 6 | 11 | 10 | 12 |

As can be seen from Table 3, the (7×16) adder structure according to the present invention has the shortest overall delay time.

Figure 23:
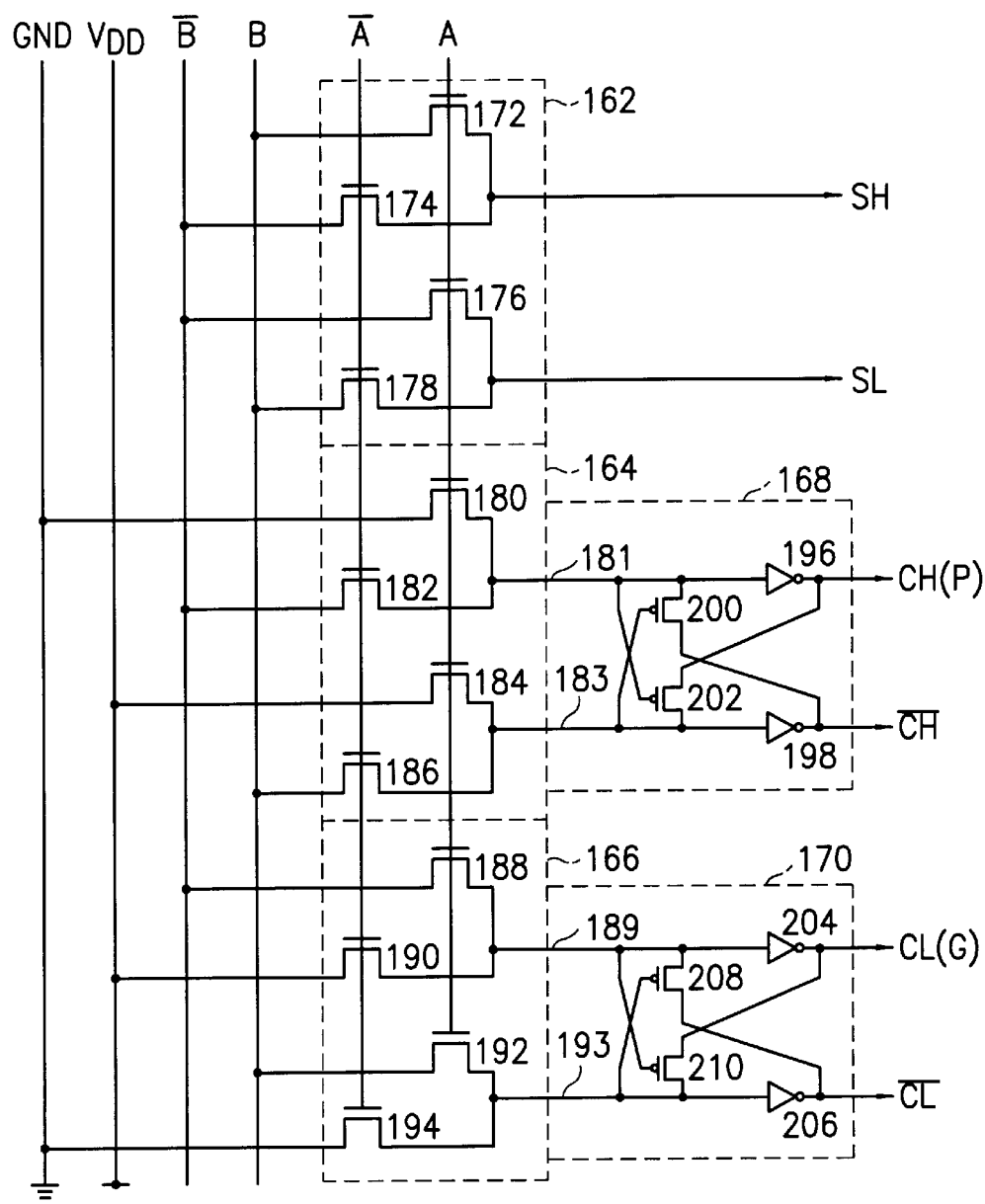
FIG. 23 is a detailed circuit diagram of the pre-carry and pre-sum generator in the 16-bit module sum generation block shown in FIG. 22.

FIG. 23 is a detailed circuit diagram of a pre-carry and pre-sum generator according to the preferred embodiment. Referring to FIG. 23, the generator 152 includes three function blocks 162, 164 and 166, and two EEPL level restoration blocks 168 and 170.

First function block 162 includes two NMOS transistors 172 and 174 for XNORing inputs A and B, and two NMOS transistors 176 and 178 for XORing inputs A and B. The XNOR logic outputs SH, and the XOR logic outputs SL. Second function block 164 includes two NMOS transistors 180 and 182 for NORing inputs A and B, and two NMOS transistors 184 and 186 for ORing inputs A and B. The NOR logic outputs /CH, the OR logic outputs CH (or P). Third fiction block 166 includes two NMOS transistors 190 and 192 for NANDing inputs A and B, and two NMOS transistors 192 and 194 for ANDing inputs A and B. The NAND logic outputs /CL, the AND logic outputs CL (or G).

The two output terminals of the second function block 164 are connected to the first EEPL level restoration block 168, and the two output terminals of the third function block 166 are connected to the second EEPL level restoration block 170. Each level restoration block, as described above with reference to FIG. 8, includes two inverters and two PMOS transistors. Specifically, in the first EEPL level restoration block 168, the input terminal of inverter 196 is connected to output terminal 181 of the NOR logic, and inverter 196 CH (or P) outputs. The input terminal of inverter 198 is connected to output terminal 183 of the NOR logic, and inverter 198 outputs /CH. The current path of PMOS transistor 200 is connected between the input terminal of inverter 196 and the output terminal of inverter 198, and the gate terminal of PMOS transistor 202 is connected to the input terminal of inverter 198. The current path of PMOS transistor 202 is connected between the input terminal of inverter 198 and the output terminal of inverter 196, and the gate terminal of PMOS transistor 202 is connected to the input terminal of inverter 196.

In the second EEPL level restoration block 170, the input terminal of inverter 204 is connected to output terminal 189 of the NAND logic, and inverter 204 outputs CL (or G). The input terminal of inverter 206 is connected to the output terminal 193 of the AND logic, and inverter 206 outputs /CL. The current path of PMOS transistor 208 is connected between the input terminal of inverter 204 and the output terminal of inverter 206, and the gate terminal of PMOS transistor 208 is connected to the input terminal of inverter 206. The current path of PMOS transistor 210 is connected between the input terminal of inverter 206 and the output terminal of inverter 204, and the gate terminal of PMOS transistor 210 is connected to the input terminal of inverter 204.

Figure 24A:
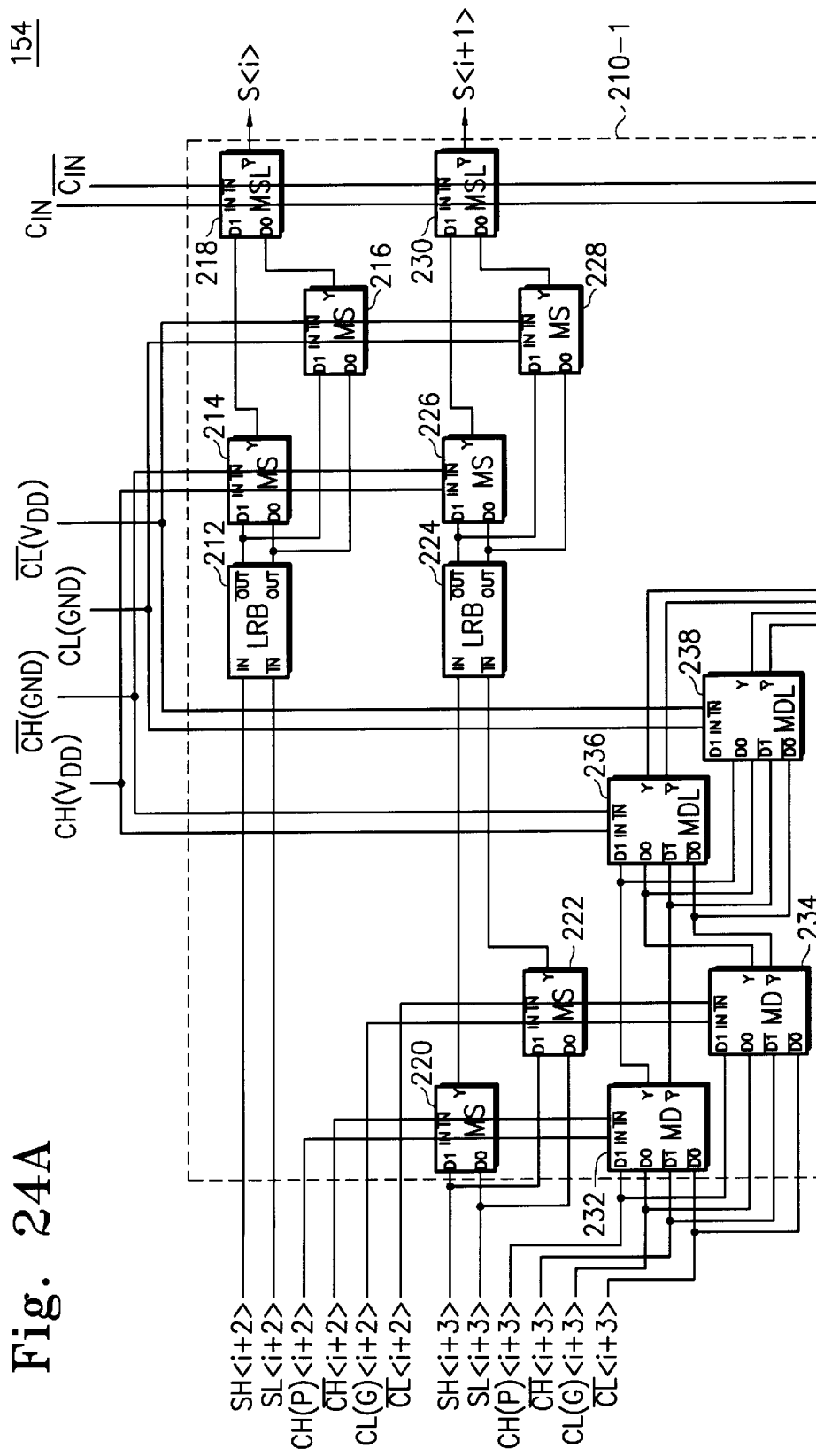
FIGS. 24A, 24B, and 24C are detailed circuit diagrams of the sum generator in the 16-bit module sum generation block shown in FIG. 22.
Figure 24B:
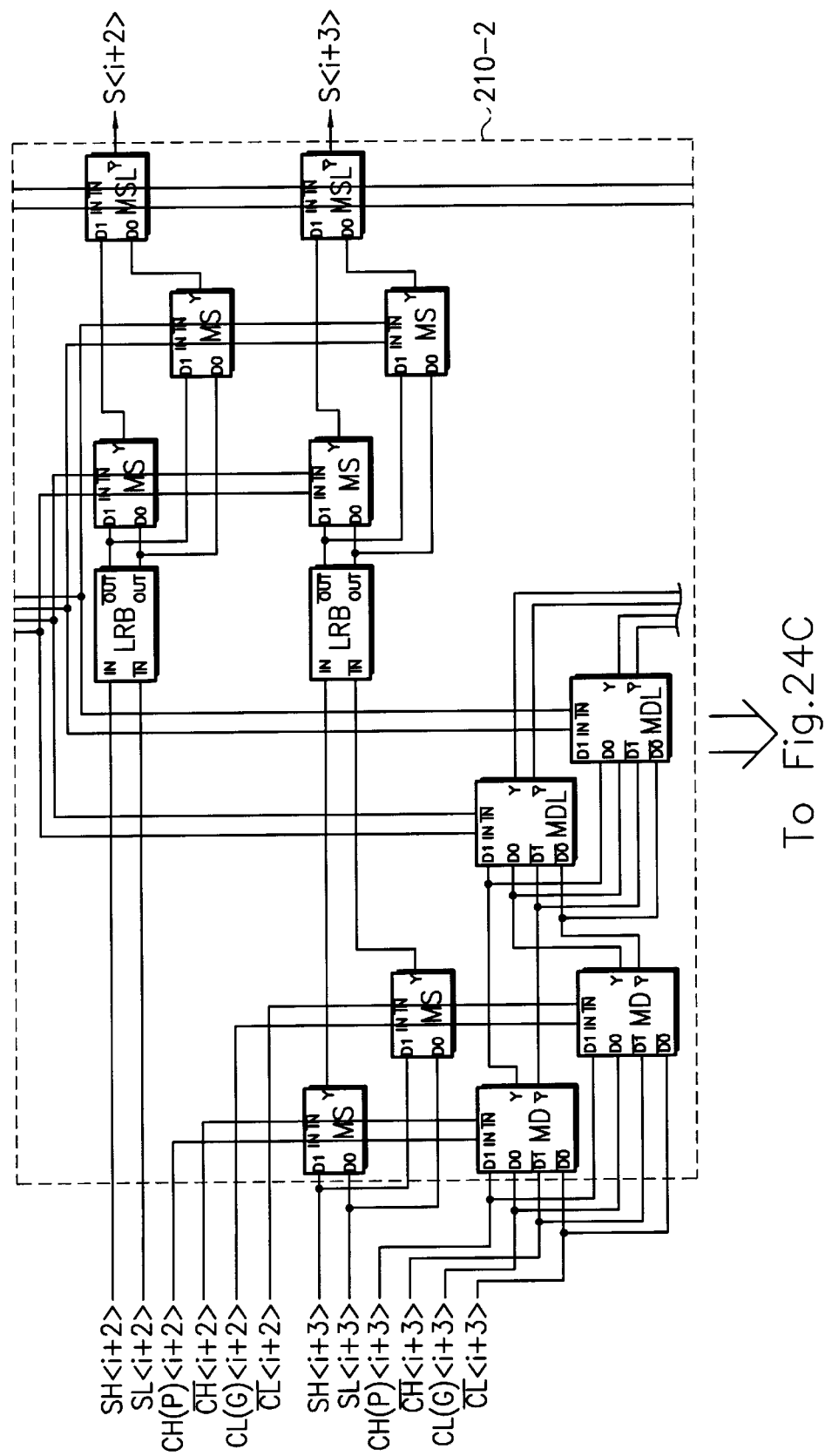
Figure 24C:
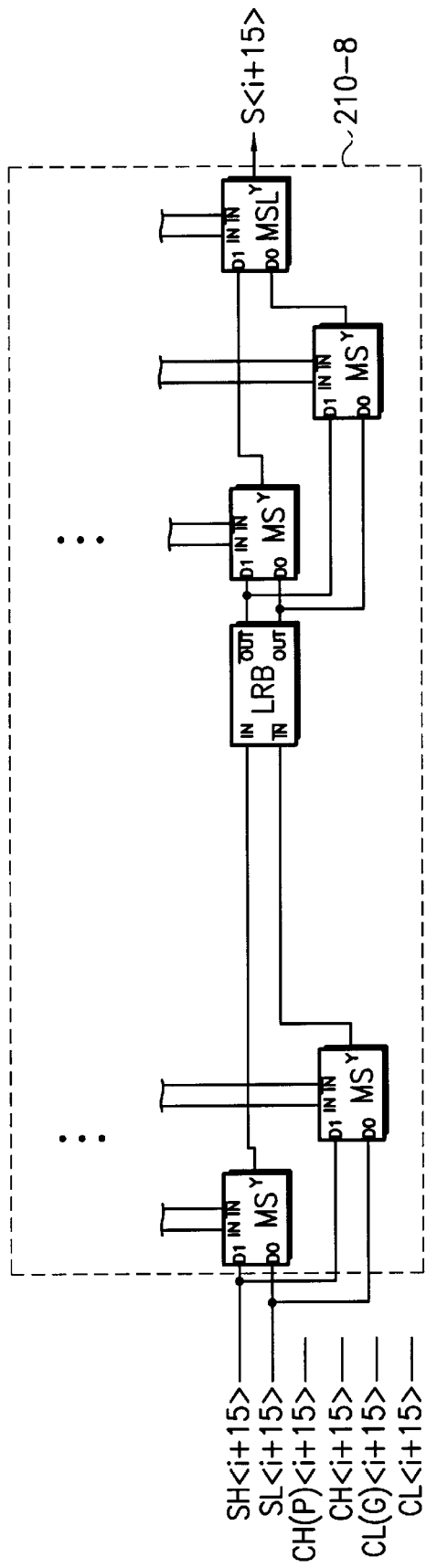
Figure 25A:
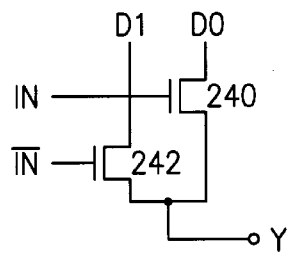
FIG. 25A is a detailed circuit diagram of a multiplexer having a single input.
Figure 25B:
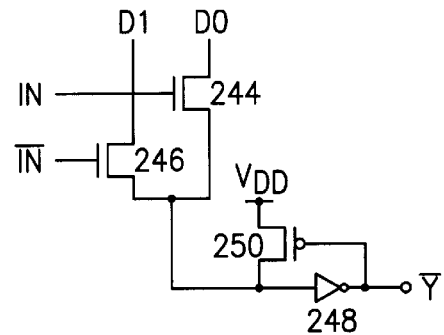
FIG. 25B is a detailed circuit diagram of a multiplexer having a single input and a revel restoration block.
Figure 25C:
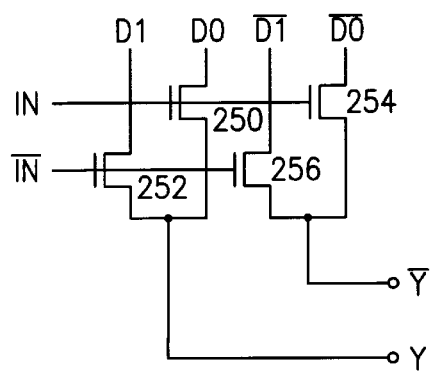
FIG. 25C is a detailed circuit diagram of a multiplexer having duplex inputs.
Figure 25D:
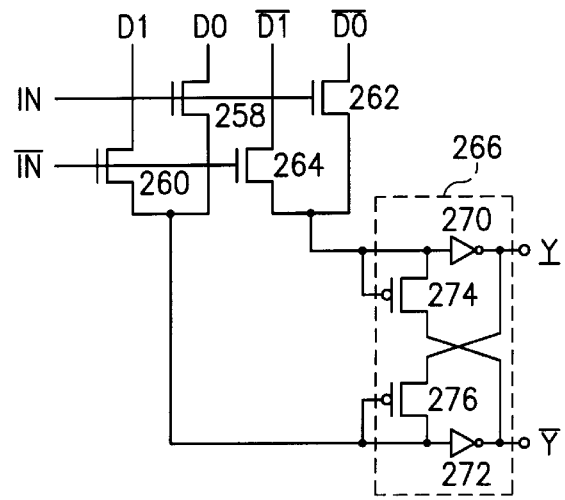
FIG. 25D is a detailed circuit diagram of a multiplexer having duplex inputs and a level restoration block.

FIGS. 24A, 24B, and 24C are detailed circuit diagrams of a 16-bit conditional sum adder. Referring to FIGS. 24A, 24B, and 24C, the adder 154 includes a plurality of multiplexers. LRB represents the EEPL level restoration circuit of FIG. 8, and MS, MSL, MD, and MDL represent the pass-transistor multiplexers of FIGS. 25A–25D, respectively. MS denotes a single multiplexer selectively outputting one of the two data bits D0 and D1 in accordance with two complementary inputs IN and /IN. As shown in FIG. 25A, MS has two NMOS transistors 240 and 242. MSL is a single multiplexer with a level restoration circuit, and it outputs the converted signal of one of the two data bits D0 and D1. Referring to FIG. 25B, MSL includes two NMOS transistors 244 and 246, an inverter 248, and a PMOS transistor 250. MD is a dual multiplexer which selectively outputs one of the two data bits D0 and D1 and its complementary inputs. As shown in FIG. 25C, MD includes four NMOS transistors 250, 252, 254 and 256. MDL is a dual multiplexer with a level restoration circuit, and outputs the inverted signals of the outputs of the dual multiplexers. Referring to FIG. 25D, MDL includes four NMOS transistors 258, 260, 262 and 264, and EEPL level restoration circuit 266. The EEPL level restoration circuit 266, as described above, includes two inverters 270 and 272, and two PMOS transistors 274 and 276.

Figure 26:
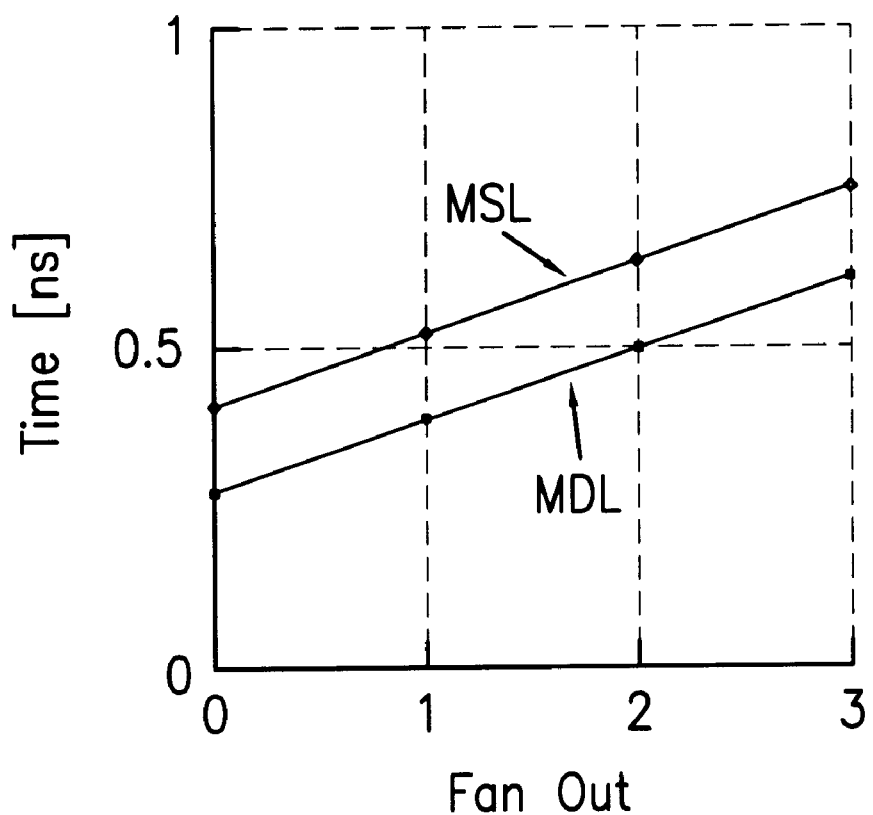
FIG. 26 is a graph showing the delay characteristic of the multiplexer according to fan-out thereof.

The SPICE simulation result of MSL and MDL is shown in FIG. 26. Referring to FIG. 26, MDL delay is shorter than MSL delay.

Referring back to FIGS. 24A, 24B, and 24C, the 16-bit conditional sum adder 154 includes eight conditional sum units 210-1–210-8. The first conditional sum unit 210-1 receives 2-bit lower order signals $SH_i$ and $SH_{i+1}$, $SL_i$ and $SL_{i+1}$, $CH_i$ and $CH_{i+1}$ and their complements /$CH_i$ and /$CH_{i+1}$, and $CL_i$ and $CL_{i+1}$ and their complements /$CL_i$ and /$CL_{i+1}$ from a pre-carry and pre-sum generator 152, and generates the 2-bit sum signals $S_i$ and $S_{i+1}$. The second conditional sum unit 210-2 receives the next 2-bit signals $SH_{i+2}$ and $SH_{i+3}$, $SL_{i+2}$ and $SL_{i+3}$, $CH_{i+2}$ and $CH_{i+3}$ and their complements /$CH_{i+2}$ and /$CH_{i+3}$, and $CL_{i+2}$ and $CL_{i+3}$ and their complements /$CL_{i+2}$ and /$CL_{i+3}$, from a pre-carry and pre-sum generator 152, and generates the next 2-bit sum signals $S_{i+2}$ and $S_{i+3}$. In this manner, the eight conditional sum adder units 210-1–210-8 produces the 16-bit sum signals $S_i$–$S_{i+15}$.

Each conditional sum adder unit includes two LRB's 212 and 224, six MS's 214, 216, 220, 222, 226 and 228, two MSL's 218 and 230, two MD's 232 and 234, and two MDL's 236 and 238. In each conditional sum unit, the input terminals IN and /IN of first LRB 212 are supplied with the lower order bit signal SH and lower order bit signal SL, respectively. First LRB 212 restores signals SH and SL to the full levels: i.e., $V_{DD}$ and $V_{SS}$ (Ground).

The full level signals SH and SL from the output terminals OUT and /OUT of LRB 212 are provided to input terminals D0 and D1, respectively, of MSs 214 and 216. MSs 214 and 216 each selectively output one of the two inputs in response to the selection signals. In conditional sum adder unit 210-1, for example, the select terminals IN and /IN of the MS 214 are supplied with control signals of $V_{DD}$ and Ground levels, respectively, and select terminals IN and /IN of the MS 216 are supplied with control signals of Ground and $V_{DD}$ levels, respectively. Therefore, MS 214 outputs signal SH and MS 216 outputs signal SL.

The signals from MSs 214 and 216 are applied to input terminals D1 and D0 of MSL 218, respectively. MSL 218 outputs the converted signal from the MS 216 as a least significant bit sum signal $S_i$ when a control signal $C_{IN}$ is at $V_{DD}$ level. On the other hand, MSL 218 outputs the converted signal from MS 214 as the least significant bit sum signal $S_i$ when a control signal /$C_{IN}$ is at $V_{DD}$ level.

The input terminals D1 and D0 of MSs 220 and 222 are supplied with the upper order bit signal SH and the upper order bit signal SL, respectively. The select terminals IN and /IN of the MS 220 are supplied lower order bit signals CH (or P) and /CH, respectively, and the select terminals IN and /IN of MS 222 are provided with lower order bit signals CL (or G) and /CL, respectively. For example, in conditional sum adder 210-1, since the signals CH and /CH are high and the signals CL and /CL are low, MSs 220 and 222 output signals $SL_{i+1}$ and $SH_{i+1}$, respectively. The output signals from MSs 220 and 222 are applied to the input terminals IN and /IN of LRB 224, respectively. Full level signals are output from the output terminals OUT and /OUT of LRB 224, respectively.

Input terminals D0 and D1 of MSs 226 and 228 are supplied with the output signals from LRB 224, respectively. MSs 226 and 228 each output one of the two inputs in response to select signals. For instance, in the conditional sum adder unit 210-1, the select terminals IN and /IN of MS 226 are supplied with control signals of $V_{DD}$ and Ground levels, respectively, and the select terminals IN and /IN of MS 228 are supplied with control signals of Ground and $V_{DD}$ levels, respectively. Thus, MS 226 outputs signal $SH_{i+1}$, and MS 228 outputs signal $SL_{i+1}$.

The signals SH from MS 226 and MS 228 are provided to input terminals D1 and D0 of MSL 230, respectively. MSL 230 outputs the signal from MS 228 as a summation signal $S_{i+1}$ when control signal $C_{IN}$ provided to the selection terminal IN of MS 230 is at $V_{DD}$ level. On the other hand, MSL 230 outputs the signal from MS 228 as a summation signal $S_{i+1}$ when control signal /$C_{IN}$ provided to the selection terminal /IN of MSL 230 is at $V_{DD}$ level.

The upper order bit signal $CH_{i+1}$ (or $P_{i+1}$) and its complement /$CH_{i+1}$, and the lower order bit signal $CL_{i+1}$ (or $G_{i+1}$) and its complement /$CL_{i+1}$ are supplied to the input terminals D1, /D1, D0 and /D0, respectively of MDs 232 and 234. The lower order bit signal $CH_i$ (or $P_i$) and its complement /$CH_i$ are supplied to the input terminals IN and /IN of MD 232. The lower order bit signal $CL_i$ (or $G_i$) and its complement /$CL_i$ are supplied to the input terminals IN and /IN of MD 234. For example, in conditional sum adder unit 210-1, since the signals $CH_i$ (or $P_i$) and /$CL_i$ have high levels and the signals $CL_i$ (or $G_i$) and /$CH_i$ have low levels, MD 232 outputs signals $CL_{i+1}$ (or $G_{i+1}$) and /$CL_{i+1}$ and MD 234 outputs signals $CH_{i+1}$ and /$CH_{i+1}$.

The signals $CL_{i+1}$ (or $G_{i+1}$), /$CL_{i+1}$, $CH_{i+1}$, and /$CH_{i+1}$ from MDs 232 and 234 are supplied to input terminals D1, /D1, D0, and /D0, respectively, of MDLs 236 and 238. MDLs 236 and 238 output one of their input signals and that input signal's compliment according to its selection signals. For example, in conditional sum address unit 210-1, the select terminals IN and /IN of MDL 236, signals $V_{DD}$ and Ground, and the select terminals of MDL 238 receive signals Ground and $V_{SS}$, respectively. The output signals from MDLs 236 and 238 are used as a control signal for the multiplexers in the next conditional sum adder unit 154.

As shown in FIGS. 24A, 24B, and 24C, according to the preferred embodiment of the invention, the delay time of the 16-bit conditional sum adder 154 is $8t_{MUX}$. Compared with a conventional conditional sum adder unit of the prior art, this represents a 56% improvement.

Figure 27:
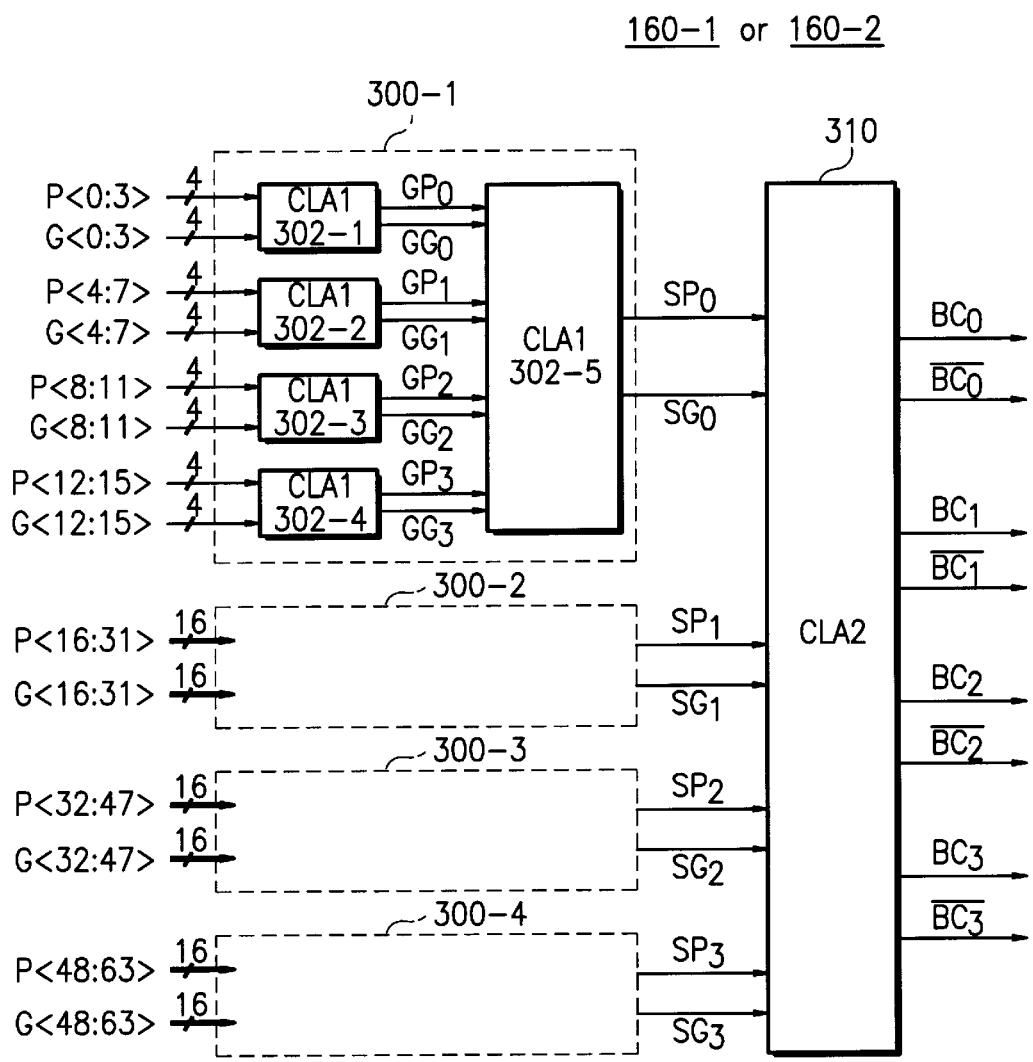
FIG. 27 is a block diagram showing the construction of the carry generation block shown in FIG. 22.

FIG. 27 shows carry generation blocks 160-1 and 160-2 schematically. Referring to FIG. 27, carry generation block 160-1 comprises five CLAs 300-1–300-4 and 310. The four CLAs 300-1–300-4 have identical structure; CLA 310 differs. Each of CLAs 300-1–300-4 has f CLA1 adders 302-1–302-5; CLA 310 uses a CLA2 adder.

In each of CLAs 300-1–300-4, 16-bit signal G and 16-bit signal P from a corresponding pre-carry and pre-sum generator 152 are divided by 4-bit groups, corresponding groups being supplied to CLA1 adders 302-1–302-4. Specifically, in CLA 300-1, CLA1 adder 302-1 receives signals $P_0$–$P_3$ and $G_0$–$G_3$, CLA1 adder 302-2 receives signals $P_4$–$P_7$ and $G_4$–$G_7$, CLA1 adder 302-3 receives signals $P_8$–$P_{11}$, and $G_8$–$G_{11}$, and CLA1 adder 302-4 receives signals $P_{12}$–$P_{15}$ and $G_{12}$–$G_{15}$. CLA1 adder 302-1 generates group carry and group carry transfer signals $GG_0$ and $GP_0$, CLA1 adder 302-2 generates signals $GG_1$ and $GP_1$. CLA1 adder 302-3 generates signals $GG_2$ and $GP_2$, and CLA1 adder 302-4 generates signals $GG_3$ and $GP_3$, respectively. The signals $GG_0$–$GG_3$ and $GP_0$–$GP_3$ from CLA1 adders 302-1–302-4 are provided to CLA1 adder 302-5. CLA1 adder 302-5 generates the first section carry generation signal $SG_0$ and the first section carry transfer signal $SP_0$. Similarly, CLAs 300-2–300-4 generate section carry generation signals $SG_1$–$SG_3$ and section carry transfer signals $SP_1$–$SP_3$.

CLA 310 receives signals $SG_0$–$SG_3$ and $SP_0$–$SP_3$. In carry generation block 160-1, CLA 310 generates block carry signals $BC_0$–$BC_3$ and their complement signals /$BC_0$–/$BC_3$. In carry generation block 160-2, CLA 310 generates block carry signals $BC_4$–$BC_6$ and their complement signals /$BC_4$–/$BC_6$.

Figure 28A:
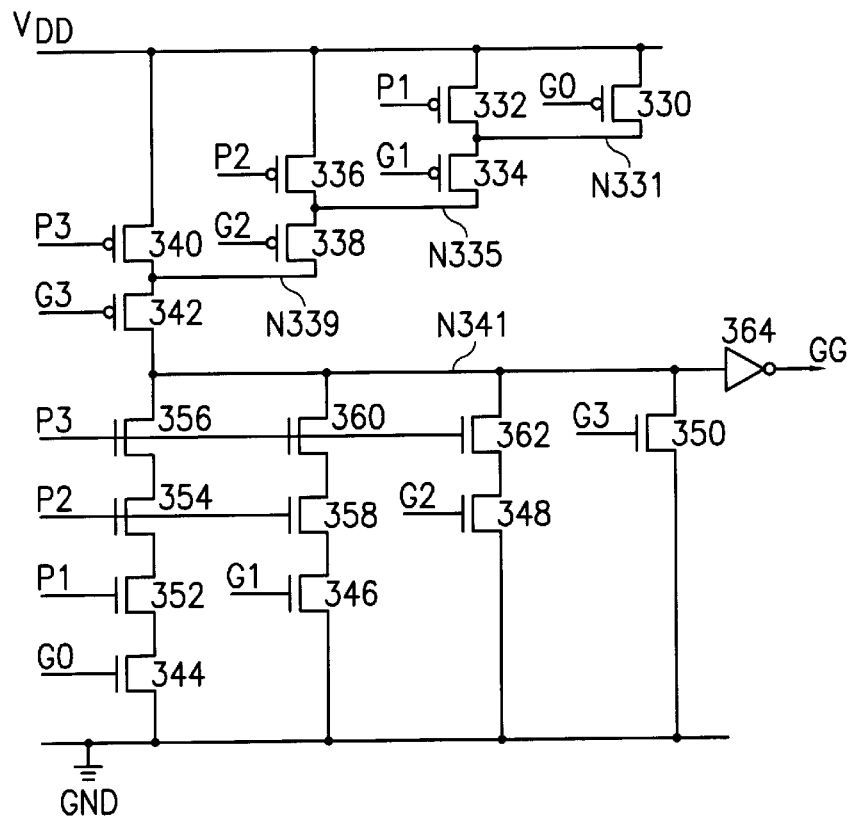
FIG. 28A is a detailed diagram of the group carry generation in the first carry lookahead adder of FIG. 27.
Figure 28B:
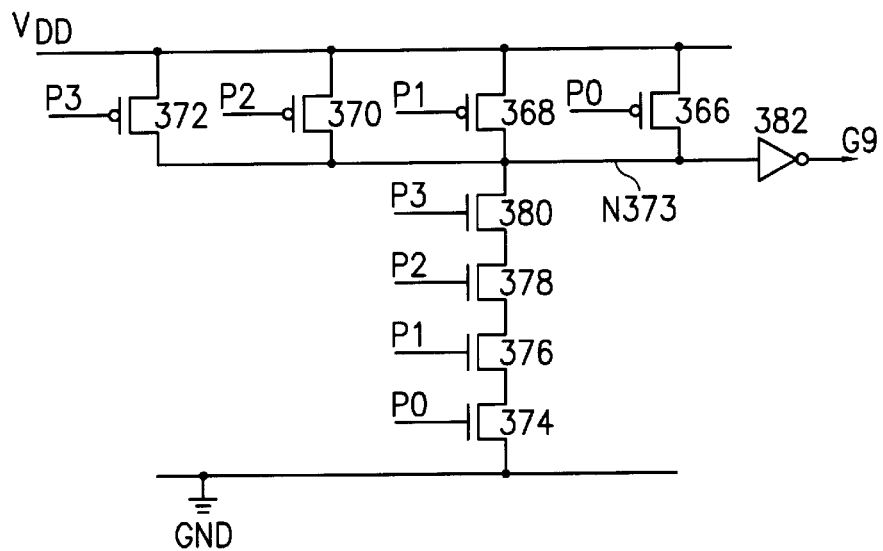
FIG. 28B is a detailed diagram of the group carry propagation in the first carry lookahead adder of FIG. 27.

FIGS. 28A and 28B are detailed circuit diagrams showing the group carry generation section and the group carry propagation section of CLA1 adders 301-1–301-5. Referring to FIGS. 28A and 28B, the group carry generation section and group carry propagation section comprise CMOS logic, as compared with the sum generation block which comprise pass-transistor logic. Using CMOS logic improves the operating speed of the 108-bit adder, reducing the carry propagation delay caused by a pass-transistor multiplexer.

As illustrated in FIG. 28A, the group carry generation section of CLA1 adders 301-1–301-5 includes seven PMOS transistors 330–342, ten NMOS transistors 344–362, and an inverter 364. The current path of PMOS transistor 330 connects the source voltage $V_{DD}$ and node N331; signal $G_0$ controls PMOS transistor 330. Current paths of PMOS transistors 332, 336 and 340 connect the source voltage $V_{DD}$ and nodes N331, N335 and N339, and signals $P_1$–$P_3$ control the PMOS transistors, respectively.

The current path of PMOS transistor 334 connects the current paths of PMOS transistors 330 and 332 and the node N335; signal $G_1$ controls PMOS transistors 334. The current path of PMOS transistor 338 connects the current paths of PMOS transistors 334 and 336 and the node N339; signal $G_2$ controls PMOS transistor 338. The current path of PMOS transistor 342 connects the current paths of PMOS transistors 338 and 340 and the node N341; signal $G_3$ controls PMOS transistor 342.

Current paths of NMOS transistors 344, 352, 354 and 356 connect in series the ground voltage Ground and the node N341; signals $G_0$ and $P_1$–$P_3$ control NMOS transistors 344, 352, 354, and 356, respectively. Current paths of NMOS transistors 346, 358 and 360 connect in series the ground voltage Ground and the node N341; signals $G_1$, $P_2$, and $P_3$ control NMOS transistors 346, 358 and 360, respectively. Current paths of NMOS transistors 348 and 362 connect in series the ground voltage Ground and the node N341; signals $G_2$ and $P_3$ control NMOS transistors 348 and 362, respectively. The current path of NMOS transistor 350 connects the ground voltage Ground and the node N341; signal $G_3$ controls NMOS transistor 350.

An inverter 364 inverts the signal generated by PMOS transistors 330–342 or NMOS transistors 344–362 on the node N341, and outputs the group carry generation signal GG.

As illustrated in FIG. 28B, the group carry propagation section of CLA1 address 302-1–302-5 comprises four PMOS transistors 366, 368, 370, and 372, four NMOS transistors 374, 376, 378, and 380 and an inverter 382. Current paths of PMOS transistors 366, 368, 370, and 372 connect in parallel between the source voltage $V_{DD}$ and the node N373; signals $P_0$–$P_3$ control NMOS transistors 366, 368, 370, and 372, respectively. Current paths of NMOS transistors 374, 376, 378, and 380 connect in series the ground voltage Ground and the node N373; signals $P_0$–$P_3$ control NMOS transistors 374, 376, 378, and 380, respectively.

An inverter 382 inverts the signal generated by PMOS transistors 366–372 on NMOS transistors 374–380 on the node N373, and outputs the group carry propagation signal GP.

Figure 29:
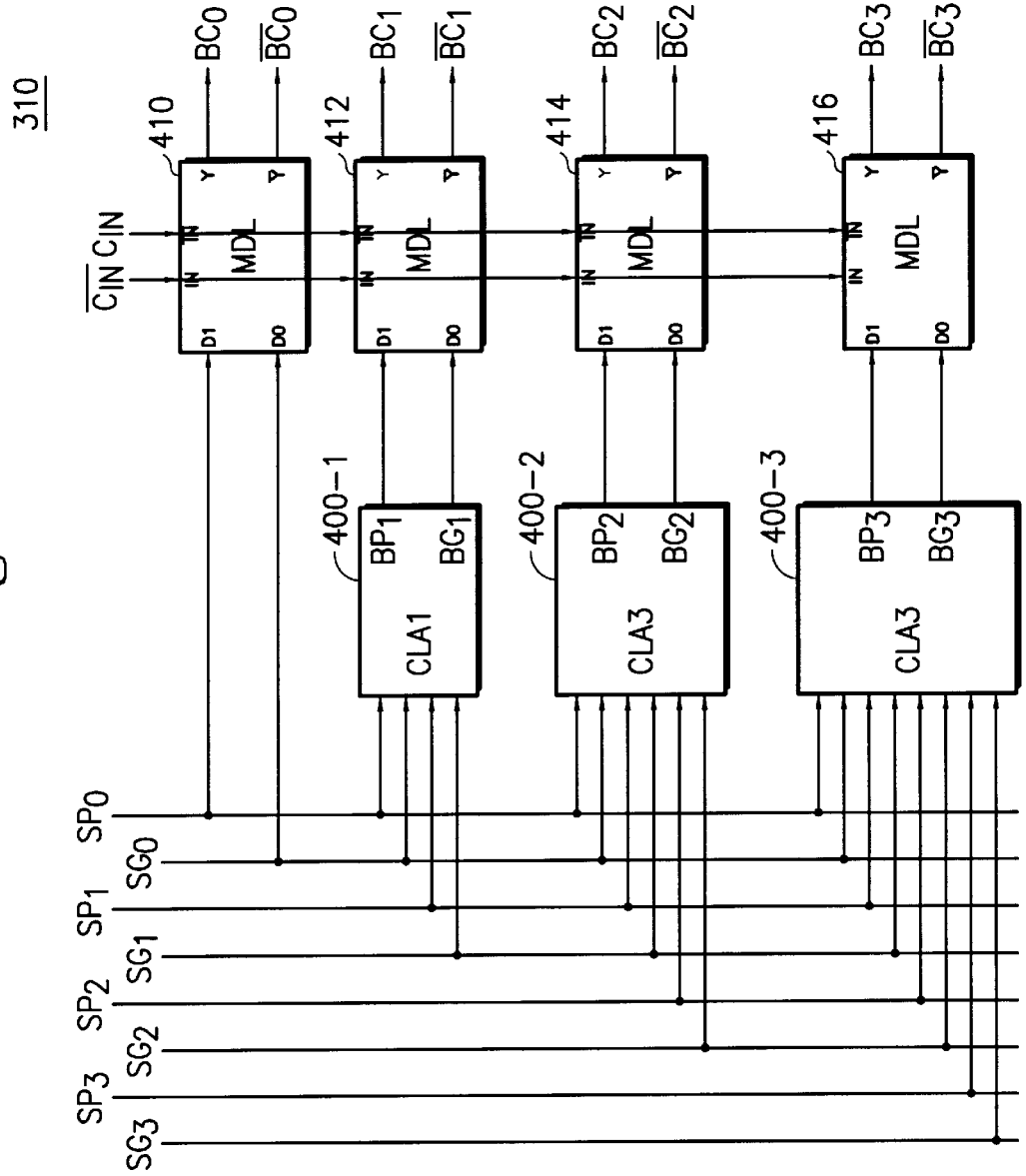
FIG. 29 is a detailed diagram of the second carry lookahead adder shown in FIG. 27.

FIG. 29 is a detailed circuit diagram of CLA2 adder 310 in FIG. 27. Referring to FIG. 29, CLA2 adder 310 includes three CLA1 adders 400-1, 400-2, and 400-3 and four MDLs 410, 412, 414, and 416.

Each CLA1 adder 400-1, 400-2 and 400-3 shown in FIG. 29 has the same construction as the CLA1 of FIG. 27, and detailed description is omitted.

CLA1 adder 400-1 receives signals $SG_0$, $SG_1$, $SP_0$, and $SP_1$ and produces signals $BG_1$ and $BP_1$. CLA1 adder 400-2 receives signals $SG_0$, $SG_1$, $SG_2$, $SP_0$, $SP_1$, and $SP_2$, and produces signals $BG_2$ and $BP_2$. CLA1 adder 400-3 receives signals $SG_0$, $SG_1$, $SG_2$, $SG_3$, $SP_0$, $SP_1$, $SP_2$, and $SP_3$, and produces signals $BG_3$ and $BP_3$.

Signals $SG_0$ and $SP_0$ comprise the inputs D0 and D1 of MDL 410. Signals $BG_1$ and $BP_1$ from the CLA1 adder 400-1 comprise the inputs D0 and D1 of MDL 412. Signals $BG_2$ and $BP_2$ from the CLA1 adder 400-2 comprise the inputs D0 and D1 of MDL 414. Signals $BG_3$ and $BP_3$ from CLA1 adder 400-3 comprise the inputs D0 and D1 of MDL 416. Finally, the selection termiinals IN and /IN of each of MDLs 410–416 receive $C_{IN}$ and /$C_{IN}$. MDLs 410–416 each select and output one of the two input signals according to the signals $C_{IN}$ and /$C_{IN}$. MDLs 410–416 produce block carry signals $BC_0$–$BC_3$ and their complements /$BC_0$–/$BC_3$.

The carry generation block 160-2 has identical construction to the carry generation block 160-1 except that the 12-bit carry generation signal G<97:108> and the 12-bit carry propagation signal P<97:108> are provided to CLA 300-4. The description of carry generation block 160-2 is omitted.

Figure 30:
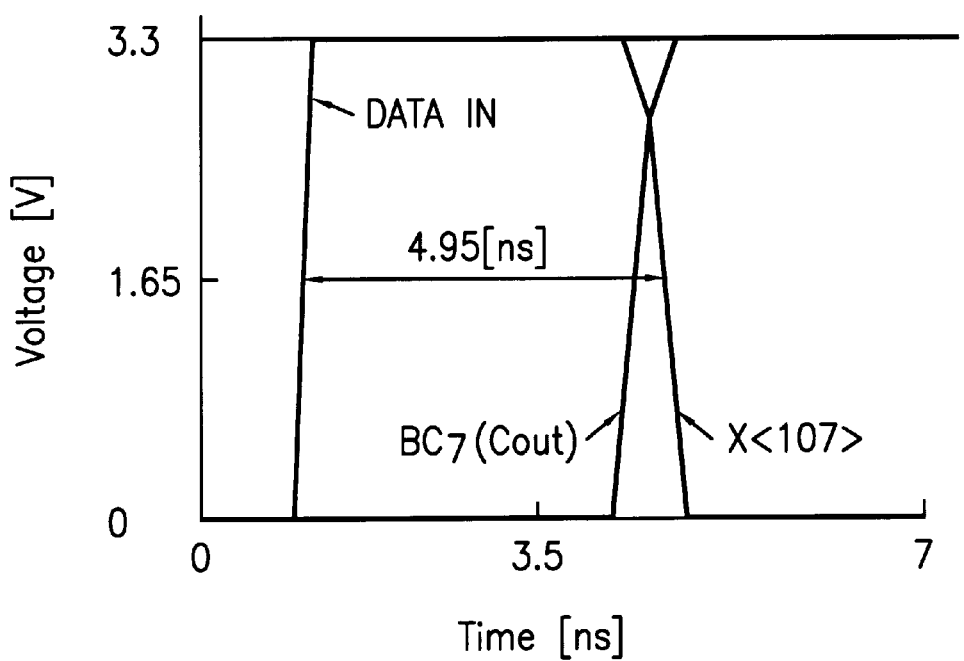
FIG. 30 is a timing diagram showing the simulation results of the 108-bit conditional sum adder according to the present invention.

FIG. 30 shows SPICE simulation results of the 108-bit conditional sum adder according to the present invention.

From FIG. 30, it can be seen that carry propagation ($BC_7$) is faster than sum propagation (S<107>).

Figure 31:
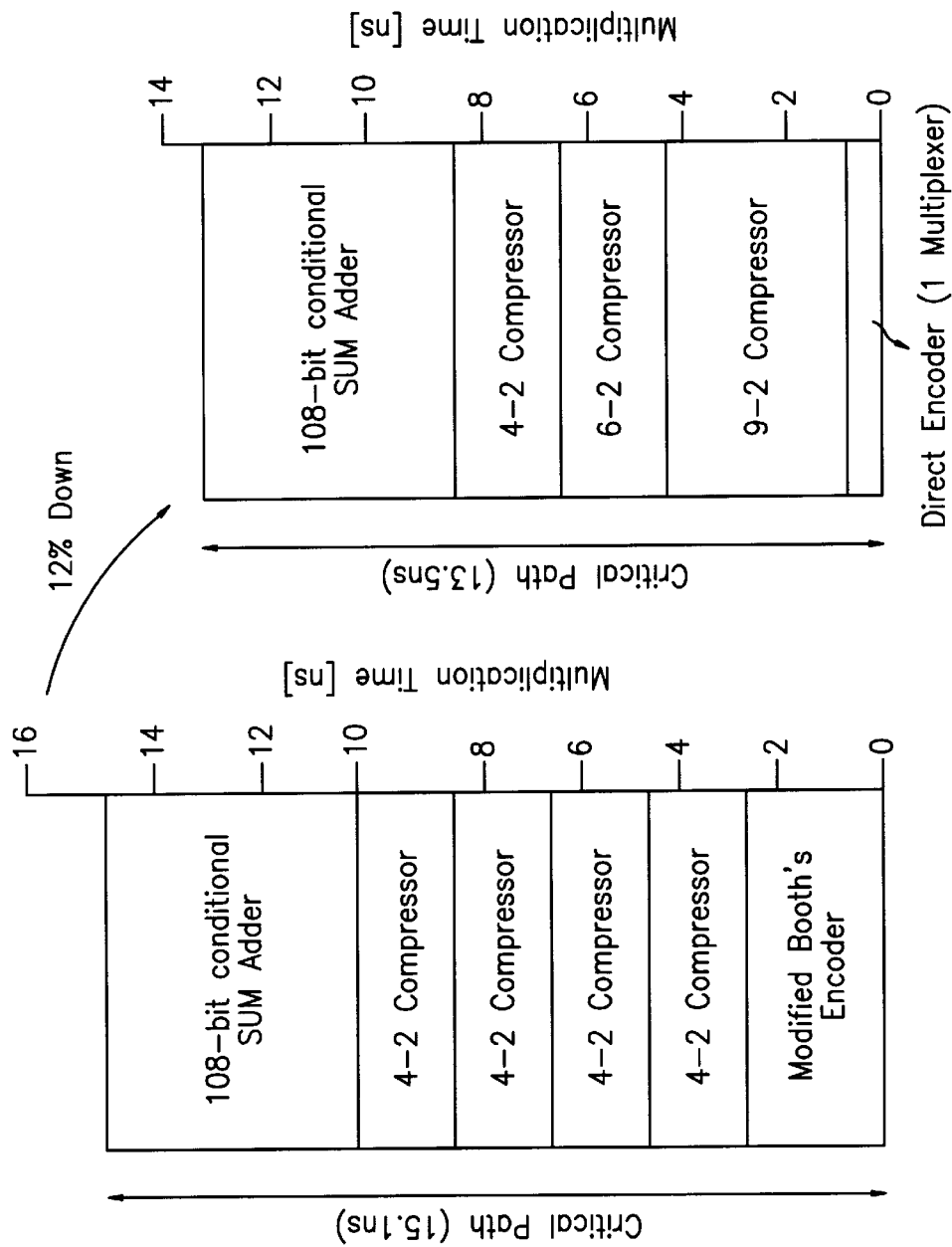
FIG. 31 is a diagram showing multiplication times of the multiplier of the prior art and the multiplier of FIG. 16.

FIG. 31 compares the multiplication time in the prior art multiplier using only 4-to-2 compressors with the multiplier of FIG. 16. As seen in FIG. 31, the multiplication time of the multiplier according to the present invention is 13.5 nanoseconds, whereas the multiplication time of the prior art multiplier is 15.1 nanoseconds. In other words, the multiplier according to the prior art takes approximately 12% more time than that of the present invention.

A conditional sum adder in which EEPL circuits are implemented according to the present invention has low power dissipation and a reduced chip area. Further, since carry generation and sum generation are performed separately and the carry propagation is faster than sum propagation, the conditional sum adder is faster.

Having illustrated and described the principles of our invention in a preferred embodiment thereof, we claim all modifications coming within the spirit and scope of the accompanying claims.

What is claimed is:

1. An N-bit conditional sum adder, wherein N is the number of adding bits, comprising:

K M-bit sum generators, wherein K is equal to ⌈N/M⌉; and

X L-bit carry generators, wherein X is equal to ⌈K/L⌉, wherein:

⌈ ⌉ represents the ceiling flnction, which returns the smallest integer greater than or equal to its operand;

each of the M-bit sum generators receives a first M-bit input signal, a complementary signal to the first M-bit input signal, a second M-bit input signal, a complementary signal to the second M-bit input signal, one carry signal corresponding to an L-bit carry signal or a complementary signal to the L-bit carry signal and a complementary signal to the carry signal, and generates an M-bit sum signal, an M-bit carry generation signal, and an M-bit carry propagation signal;

the first to the (X−1)-th carry generator of the X L-bit carry generators each receive an (L×M)-bit carry generation signal and an (L×M)-bit carry propagation signal from L corresponding M-bit sum generators of the K M-bit sum generators, and generate the L-bit carry signal and the complementary signal to the L-bit carry signal; and the X-th carry generator of the X L-bit carry generators receives the carry generation and carry propagation signals from the other M-bit sum generators of the K M-bit sum generators, and generates the carry signal and the complementary signal to the carry signal.

2. The N-bit conditional sum adder according to claim 1, wherein each of the M-bit sum generators comprises a pass-transistor logic.

3. The N-bit conditional sum adder according to claim 1, wherein each of the L-bit carry generators comprises a CMOS logic.

4. The N-bit conditional sum adder according to claim 1, wherein each of the M-bit sum generators comprises a pass-transistor logic and each of the L-bit carry generators comprises a CMOS logic.

5. The N-bit conditional sum adder according to claim 1, wherein each of the M-bit sum generators comprises:

means for receiving the first M-bit input signal, the complementary signal to the first M-bit input signal, the second M-bit input signal, and the complementary signal to the second M-bit input signal;

means for generating a first M-bit conditional sum signal, a second M-bit conditional sum signal, an M-bit carry propagation signal, a complementary signal to the M-bit carry propagation signal, an M-bit carry generation signal and a complementary signal to the M-bit carry generation signal;

means for receiving the first M-bit conditional sum signal, the second M-bit conditional sum signal, the M-bit carry propagation signal, the complementary signal to the M-bit propagation signal, the M-bit carry generation signal, the complementary signal to the M-bit carry generation signal, one carry signal corresponding to the L-bit carry signal or the complementary signal to the L-bit carry signal, and a complementary signal to the carry signal; and means for generating the M-bit sum signal.

6. An N-bit conditional sum adder, wherein N is the number of adding bits, comprising:

K 16-bit sum generators, wherein K is equal to N/16; and

X 4-bit carry generators, wherein X is equal to K/4, wherein:

each of the 16-bit sum generators receives a first 16-bit input signal, a complementary signal to the first 16-bit input signal, a second 16-bit input signal, a complementary signal to the second 16-bit input signal, one carry signal corresponding to a 4-bit carry signal or a complementary signal to the 4-bit carry signal, and a complementary signal to the carry signal, and generates a 16-bit sum signal, a 16-bit carry generation signal, and a 16-bit carry propagation signal;

the first to the (X−1)-th carry generator of the X 4-bit carry generators each receive a (4×16)-bit carry generation signal and a (4×16)-bit carry propagation signal from 4 corresponding 16-bit sum generators of the K 16-bit sum generators, and generate the 4-bit carry signal and the complementary signal to the 4-bit carry signal;

the X-th carry generator of the X 4-bit carry generators receives the carry generation and carry propagation signals from the other 16-bit sum generators of the 16-bit sum generators, and generates the carry signal and the complementary signal to the carry signal; and each of the 16-bit sum generators comprises:

means for receiving the first 16-bit input signal, the complementary signal to the first 16-bit input signal, the second 16-bit input signal, and the complementary signal to the second 16-bit input signal;

means for generating a first 16-bit conditional sum signal, a second 16-bit conditional sum signal, a 16-bit carry propagation signal, a complementary signal to the 16-bit carry propagation signal, a 16-bit carry generation signal and a complementary signal to the 16-bit carry generation signal;

means for receiving the first 16-bit conditional sum signal, the second 16-bit conditional sum signal, the 16-bit carry propagation signal, the complementary signal to the 16-bit propagation signal, the 16-bit carry generation signal, the complementary signal to the 16-bit carry generation signal, one carry signal corresponding to the 4-bit carry signal or the complementary signal to the 4-bit carry signal, and a complementary signal to the carry signal; and means for generating the 16-bit sum signal.

7. A conditional sum adder comprising:

first to seventh 16-bit sum generators; and first and second 4-bit carry generators, wherein:

each of the 16-bit sum generators receives a first 16-bit input signal, a complementary signal to the first 16-bit input signal, a second 16-bit input signal, a complementary signal to the second 16-bit input signal, one carry signal corresponding to a 4-bit carry signal or a complementary signal to the 4-bit carry signal, and a complementary signal to the carry signal, and generates a 16-bit sum signal;

the first 4-bit carry generator receives a 64-bit carry generation signal and a 64-bit carry propagation signal provided by the first to the fourth 16-bit sum generators, and generates the 4-bit carry signal and the complementary signal to the 4-bit carry signal; and the second 4-bit carry generator receives a 48-bit carry generation signal and a 48-bit carry propagation signal provided by the fifth to seventh 16-bit sum generators, and generates the carry signal and the complementary signal to the carry signal.

8. The conditional sum adder according to claim 7, wherein each of the 16-bit sum generators comprises:

means for receiving the first 16-bit input signal, the complementary signal to the first 16-bit input signal, the second 16-bit input signal and the complementary signal to the second 16-bit input signal;

means for generating a first 16-bit conditional sum signal, a second 16-bit conditional sum signal, a 16-bit carry propagation signal, a complementary signal to the 16-bit carry propagation signal, a 16-bit carry generation signal and a complementary signal to the 16-bit carry generation signal;

means for receiving the first 16-bit conditional sum signal, the second 16-bit conditional sum signal, the 16-bit carry propagation signal, the complementary signal to the 16-bit carry propagation signal, the 16-bit carry generation signal, the complementary signal to the 16-bit carry generation signal, one carry signal corresponding to the 4-bit carry signal or the complementary signal to the 4-bit carry signal, and a complementary signal to the carry signal; and means for generating the 16-bit sum signal.

9. The conditional sum adder according to 8, wherein each of the 16-bit sum generators comprises a pass-transistor logic.

10. The conditional sum adder according to 9, wherein each of the 4-bit carry generators comprises a CMOS logic.

11. An N-bit conditional sum adder, wherein N is the number of adding bits, comprising:

K M-bit sum generators, each of which receives a first M-bit input signal, a complementary signal to the first M-bit input signal, a second M-bit input signal, a complementary signal to the second M-bit input signal, one carry signal corresponding to an L-bit carry signal or the complementary signal to the L-bit carry signal, and a complementary signal to the carry signal, and generates an M-bit sum signal, wherein K is equal to $\lceil N/M \rceil$; and X L-bit carry generators, each of which receives an (L×M)-bit carry generation signal and an (L×M)-bit carry propagation signal from L corresponding sum generators, and generates an L-bit carry signal and a complementary signal to the L-bit carry signal, wherein X is equal to $\lceil K/L \rceil$, wherein:

$\lceil\ \rceil$ represents the ceiling function, which returns the smallest integer greater than or equal to its operand; and each of the M-bit sum generators comprises:

a (6×M)-bit pre-carry and pre-sum generation block for receiving the first M-bit input signal, the complementary signal to the first M-bit input signal, the second M-bit input signal, and the complementary signal to the second M-bit input signal, and generating a first M-bit conditional sum signal, a second M-bit conditional sum signal, an M-bit carry propagation signal, a complementary signal to the M-bit carry propagation signal, an M-bit carry generation signal and a complementary signal to the M-bit carry generation signal; and an M-bit carry lookahead addition block for receiving the first M-bit conditional sum signal, the second M-bit conditional sum signal, the M-bit carry generation signal, the complementary signal to the M-bit carry generation signal, the M-bit carry propagation signal, the complementary signal to the M-bit carry propagation signal, one carry signal corresponding to the L-bit carry signal or the complementary signal of the L-bit carry signal, and the complementary signal to the carry signal, and generating the M-bit sum signal.

12. The N-bit conditional sum adder according to claim 11, wherein the (6×M)-bit pre-carry and pre-sum generation block comprises:

a first logic means for receiving the first M-bit input signal, the complementary signal to the first M-bit signal, the second M-bit input signal, and the complementary signal to the second M-bit input signal, and generating the first M-bit conditional sum signal and the second M-bit conditional sum signal;

a second logic means for receiving the first M-bit input signal, the complementary signal to the first M-bit signal, the second M-bit input signal, and the complementary signal to the second M-bit input signal, and generating the M-bit carry propagation signal and the complementary signal to the M-bit carry propagation signal; and a third logic means for receiving the first M-bit input signal, the complementary signal to the first M-bit signal, the second M-bit input signal, and the complementary signal to the second M-bit input signal, and generating the M-bit carry generation signal and the complementary signal to the M-bit carry generation signal.

13. The N-bit conditional sum adder according to claim 12, wherein the first logic means comprises:

an XNOR logic for performing an XNOR operation on the first M-bit input signal, the complementary signal to the first M-bit signal, the second M-bit input signal, and the complementary signal to the second M-bit input signal, to generate the first M-bit conditional sum signal; and an XOR logic for performing an XOR operation on the first M-bit input signal, the complementary signal to the first M-bit signal, the second M-bit input signal, and the complementary signal to the second M-bit input signal, to generate the second M-bit conditional sum signal.

14. The N-bit conditional sum adder according to claim 12, wherein the second logic means comprises:

a NOR logic for performing a NOR operation on the first M-bit input signal, the complementary signal to the first M-bit signal, the second M-bit input signal, and the complementary signal to the second M-bit input signal, to generate an output signal from the NOR logic;

an OR logic for performing an OR operation on the first M-bit input signal, the complementary signal to the first M-bit signal, and the second M-bit input signal, and the complementary signal to the second M-bit input signal, to generate an output signal from the OR logic; and a first level restoration means for restoring the output signal from the NOR logic to generate a restored signal as the M-bit carry propagation signal and restoring the output signal from the OR logic to generate a restored signal as the complementary signal to the M-bit carry propagation signal.

15. The N-bit conditional sum adder according to claim 14, wherein the first level restoration means comprises a first inverter having an input terminal connected to the output signal from the NOR logic and an output terminal generating the M-bit carry propagation signal, a second inverter having an input terminal connected to the output signal from the OR logic and an output terminal generating the complementary signal to the M-bit carry propagation signal, a first PMOS transistor having a current path connected between the input terminal of the first inverter and the output terminal of the second inverter and a gate connected to the input terminal of the second inverter, and a second PMOS transistor having a current path connected between the output terminal of the first inverter and the input terminal of the second inverter and a gate connected to the input terminal of the first inverter.

16. The N-bit conditional sum adder according to claim 12, wherein the third logic means comprises:

a NAND logic for performing a NAND operation on the first M-bit input signal, the complementary signal to the first M-bit signal, the second M-bit input signal, and the complementary signal to the second M-bit input signal, to generate an output signal from the NAND logic;

an AND logic for performing an AND operation on the first M-bit input signal, the complementary signal to the first M-bit signal, and the second M-bit input signal, and the complementary signal to the second M-bit input signal, to generate an output signal from the AND logic; and a second level restoration means for restoring the output signal from the NAND logic to generate a restored signal as the M-bit carry generation signal and restoring the output signal from the AND logic to generate a restored signal as the complementary signal to the M-bit carry generation signal.

17. The N-bit conditional sum adder according to claim 16, wherein the second level restoration means comprises a third inverter having an input terminal connected to the output signal from the NAND logic and an output terminal generating the M-bit carry generation signal, a fourth inverter having an input terminal connected to the output signal from the AND logic and an output terminal generating the complementary signal to the M-bit carry generation signal, a third PMOS transistor having a current path connected between the input terminal of the third inverter and the output terminal of the fourth inverter and a gate connected to the input terminal of the fourth inverter, and a fourth PMOS transistor having a current path connected between the output terminal of the third inverter and the input terminal of the fourth inverter and a gate connected to the input terminal of the third inverter.

18. The N-bit conditional sum adder according to claim 11, wherein the M-bit carry lookahead addition block comprises M/2 carry lookahead addition units, each of which receives two bits of the first M-bit conditional sum signal, two bits of the second M-bit conditional sum signal, two bits of the M-bit carry propagation signal, two bits of the complementary signal to the M-bit carry propagation signal, two bits of the M-bit carry generation signal, and two bits to the complementary signal of the M-bit carry generation signal, and generates a 2-bit sum signal, wherein each of the M/2 carry lookahead addition units comprises:

a third level restoration means for receiving one of the two bits of the first M-bit conditional sum signal and one of the two bits of the second M-bit conditional sum signal so as to generate a first restored input signal and an inverse signal of the first restored input signal;

a first multiplexer for receiving the first restored input signal and the inverse of the first restored input signal from the third level restoration means as input signals so as to select one of the input signals in response to first and second control signals, respectively, the first and second control signals being complementary to each other;

a second multiplexer for receiving the first restored input signal and the inverse of the first restored input signal from the third level restoration means as input signals so as to select one of the input signals in response to third and fourth control signals, respectively, the third and fourth control signals being complementary to each other;

a third multiplexer for receiving the output signals from the first and second multiplexers as input signals so as to select one of the input signals in response to a carry control signal and a complementary signal to the carry control signal and to output an inverse signal of the selected signal as a lower-order bit sum signal;

a fourth multiplexer for receiving the other one of the two bits of the first M-bit conditional sum signal and the other one of the two bits of the second M-bit conditional sum signal as input signals so as to select one of the input signals in response to one of the two bits of the M-bit carry propagation signal and the complementary signal to the one of the two bits of the M-bit carry propagation signal as an output signal;

a fifth multiplexer for receiving the other one of the two bits of the first M-bit conditional sum signal and the other one of the two bits of the second M-bit conditional sum signal as input signals so as to select one of the input signals in response to one of the two bits of the M-bit carry generation signal and the complementary signal to the one of the two bits of the M-bit carry generation signal as an output signal;

a fourth level restoration means for receiving output signals from the fourth and fifth multiplexers so as to generate a second restored input signal and an inverse signal of the second restored input signal;

a sixth multiplexer for receiving the second restored input signal and the inverse signal of the second restored input signal from the fourth level restoration means as input signals and so as to select one of the input signals in response to the first and second control signals, respectively;

a seventh multiplexer for receiving the second restored input signal and the inverse of the second restored input signal from the fourth level restoration means as input signals so as to select one of the input signals in response to the third and fourth control signals, respectively;

an eighth multiplexer for receiving output signals from the sixth and seventh multiplexers as input signals so as to select one of the input signals in response to the carry control signal and the complementary signal to the carry control signal and to output an inverse signal of the selected signal as an upper-order bit sum signal;

a ninth multiplexer for receiving the other one of the two bits of the M-bit carry propagation signal, the complementary signal to the other one of the two bits of the M-bit carry propagation signal, the other one of the two bits of the M-bit carry generation signal, and the complementary signal to the other one of the two bits of the M-bit carry generation signal so as to select two signals of the input signals in response to the one of the two bits of the M-bit carry propagation signal and the complementary signal to the one of the two bits of the M-bit carry propagation signal;

a tenth multiplexer for receiving the other one of the two bits of the M-bit carry propagation signal, the complementary signal to the other one of the two bits of the M-bit carry propagation signal, the other one of the two bits of the M-bit carry generation signal, and the complementary signal to the other one of the two bits of the M-bit carry generation signal so as to select two signals of the input signals in response to the one of the two bits of the M-bit carry generation signal and the complementary signal to the one of the two bits of the M-bit carry generation signal;

an eleventh multiplexer for receiving the output signals of the ninth and tenth multiplexers as input signals so as to select two of the input signals in response to the first and second control signals and generating the selected two signals as the first and second control signals of a next carry lookahead addition unit; and a twelfth multiplexer for receiving the output signals of the ninth and tenth multiplexers as input signals so as to select two of the input signals in response to the third and fourth control signals and generating the selected two signals as the third and fourth control signals of the next carry lookahead addition unit.

19. The N-bit conditional sum adder according to claim 11, wherein each of the M-bit sum generators comprises a pass-transistor logic and each of the L-bit carry generators comprises a CMOS logic.

20. A conditional sum adder comprising:

seven sum generators, each of which receives a first M-bit input signal, a complementary signal to the first M-bit input signal, a second M-bit input signal, a complementary signal to the second M-bit input signal, one bit of a 4-bit carry signal, and a complementary signal to the one bit of the 4-bit carry signal, and generates a M-bit sum signal; and two carry generators, the first of which receives a (4×M)-bit carry generation signal and a (4×M)-bit carry propagation signal from four corresponding sum generators, and generates a 4-bit carry signal and a complementary signal to the 4-bit carry signal, and the second of which receives a (3×M)-bit carry generation signal and a (3×M)-bit carry propagation signal from three corresponding sum generators, and generates a 3-bit carry signal and a complementary signal to the 3-bit carry signal, wherein each of the two sum generators comprises:

a pre-carry and pre-sum generation block for receiving the first M-bit input signal, the complementary signal to the first M-bit input signal, the second M-bit input signal, and the complementary signal to the second M-bit input signal, and generating a first M-bit conditional sum signal, a second M-bit conditional sum signal, a M-bit carry propagation signal, a complementary signal to the M-bit carry propagation signal, a M-bit carry generation signal, and a complementary signal to the M-bit carry generation signal; and an M-bit carry lookahead addition block for receiving the first M-bit conditional sum signal, the second M-bit conditional signal, the M-bit carry propagation signal, the complementary signal to the M-bit carry propagation signal, the M-bit carry generation signal, the complementary signal to the M-bit carry generation signal, the one bit of the 4-bit carry signal, and the complementary signal to the one bit of the 4-bit carry signal, and generating the sum signal; and wherein each of the two carry generators comprises:

a group of four first carry lookahead addition sections, each of which receives a corresponding M-bit carry generation signal and a corresponding M-bit carry propagation signal and generates a 1-bit carry generation signal and a 1-bit carry propagation signal; and a second carry lookahead addition section for receiving the 1-bit carry generation signals and the 1-bit carry propagation signals from the group of four first carry lookahead addition sections, one bit of the 4-bit carry signal, and a complementary signal to the one bit of the 4-bit carry signal, and generating the 4-bit carry signal and the complementary signal to the 4-bit carry signal.

21. The conditional sum adder according to claim 20, wherein the pre-carry and pre-sum generation block comprises:

a first logic means for receiving two corresponding input signals and generating first and second sum signals;

a second logic means for receiving the two corresponding input signals and generating a carry propagation signal and a complementary signal to the carry propagation signal; and a third logic means for receiving the two corresponding input signals and generating a carry generation signal and a complementary signal to the carry generation signal.

22. The conditional sum adder according to claim 21, wherein the first logic means comprises:

an XNOR logic for performing an XNOR operation of the two corresponding input signals to generate the first sum signal; and an XOR logic for performing an XOR operation of the two corresponding input signals to generate the second sum signal.

23. The conditional sum adder according to claim 21, wherein the second logic means comprises:

a NOR logic for performing an NOR operation of the two corresponding input signals to generate an output signal from the NOR logic;

an OR logic for performing an OR operation of the two corresponding input signals to generate an output signal from the OR logic; and a first level restoration means for restoring the output signal from the NOR logic to generate a restored signal as the carry propagation signal and restoring the output signal from the OR logic to generate a restored signal as the complementary signal to the carry propagation signal.

24. The conditional sum adder according to claim 23, wherein the first level restoration means comprises:

a first inverter having an input terminal connected to the output signal from the NOR logic and an output terminal generating the carry propagation signal;

a second inverter having an input terminal connected to the output signal from the OR logic and an output terminal generating the complementary signal of the carry propagation signal;

a first PMOS transistor having a current path connected between the input terminal of the first inverter and the output terminal of the second inverter and a gate connected to the input terminal of the second inverter; and a second PMOS transistor having a current path connected between the output terminal of the first inverter and the input terminal of the second inverter and a gate connected to the input terminal of the first inverter.

25. The conditional sum adder according to claim 21, wherein the third logic means comprises:

a NAND logic for performing a NAND operation of the two corresponding input signals to generate an output signal from the NAND logic;

an AND logic for performing an AND operation of the two corresponding input signals to generate an output signal from the AND logic; and a second level restoration means for restoring the output signal from the NAND logic to generate a restored signal as the carry generation signal and restoring the output signal from the AND logic to generate a restored signal as the complementary signal to the carry generation signal.

26. The conditional sum adder according to claim 25, wherein the second level restoration means comprises:

a third inverter having an input terminal connected to the output signal from the NAND logic and an output terminal generating the carry generation signal;

a fourth inverter having an input terminal connected to the output signal from the AND logic and an output terminal generating the complementary signal to the carry generation signal;

a third PMOS transistor having a current path connected between the input terminal of the third inverter and the output terminal of the fourth inverter and a gate connected to the input terminal of the fourth inverter; and a fourth PMOS transistor having a current path connected between the output terminal of the third inverter and the input terminal of the fourth inverter and a gate connected to the input terminal of the third inverter.

27. The conditional sum adder according to claim 20, wherein the M-bit carry lookahead addition block comprises M/2 carry lookahead addition units, each of which receives two bits of the first M-bit conditional sum signal, two bits of the second M-bit conditional sum signal, two bits of the M-bit carry propagation signal, two bits of the complementary signal to the M-bit carry propagation signal, two bits of the M-bit carry generation signal, and two bits of the complementary signal to the M-bit carry generation signal, and generates a 2-bit sum signal, wherein each of the M/2 carry lookahead addition units comprises:

a third level restoration means for receiving one of the two bits of the first M-bit conditional sum signal and one of the two bits of the second M-bit conditional sum signal so as to generate a first restored input signal and an inverse signal of the first restored input signal;

a first multiplexer for receiving the first restored input signal and the inverse of the first restored input signal from the third level restoration means as input signals so as to select one of the input signals in response to first and second control signals, respectively, the first and second control signals being complementary to each other;

a second multiplexer for receiving the first restored input signal and the inverse of the first restored input signal from the third level restoration means as input signals so as to select one of the input signals in response to third and fourth control signals, respectively, the third and fourth control signals being complementary to each other;

a third multiplexer for receiving the output signals from the first and second multiplexers as input signals so as to select one of the input signals in response to a carry control signal and a complementary signal to the carry control signal and to output an inverse signal of the selected signal as a lower-order bit sum signal;

a fourth multiplexer for receiving the other one of the two bits of the first M-bit conditional sum signal and the other one of the two bits of the second M-bit conditional sum signal as input signals so as to select one of the input signals in response to one of the two bits of the M-bit carry propagation signal and the complementary signal to the one of the two bits of the M-bit carry propagation signal;

a fifth multiplexer for receiving the other one of the two bits of the first M-bit conditional sum signal and the other one of the two bits of the second M-bit conditional sum signal as input signals so as to select one of the input signals in response to the one of the two bits of the M-bit carry generation signal and the complementary signal to the one of the two bits of the M-bit carry generation signal;

a fourth level restoration means for receiving the output signals from the fourth and fifth multiplexers so as to generate a second restored input signal and an inverse signal of the second restored input signal;

a sixth multiplexer for receiving the second restored input signal and the inverse signal of the second restored input signal from the fourth level restoration means as input signals and so as to select one of the input signals in response to the first and second control signals, respectively;

a seventh multiplexer for receiving the second restored input signal and the inverse of the second restored input signal from the fourth level restoration means as input signals so as to select one of the input signals in response to the third and fourth control signals, respectively;

an eighth multiplexer for receiving output signals from the sixth and seventh multiplexers as input signals so as to select one of the input signals in response to the carry control signal and the complementary signal to the carry control signal and to output an inverse signal of the selected signal as an upper-order bit sum signal;

a ninth multiplexer for receiving the other one of the two bits of the M-bit carry propagation signal, the complementary signal to the other one of the two bits of the M-bit carry propagation signal, the other one of the two bits of the M-bit carry generation signal, and the complementary signal to the other one of the two bits of the M-bit carry generation signal so as to select two signals of the input signals in response to the one of the two bits of the M-bit carry propagation signal and the complementary signal to the one of the two bits of the M-bit carry propagation signal;

a tenth multiplexer for receiving the other one of the two bits of the M-bit carry propagation signal, the complementary signal to the other one of the two bits of the M-bit carry propagation signal, the other one of the two bits of the M-bit carry generation signal, and the complementary signal to the other one of the two bits of the M-bit carry generation signal so as to select two signals of the input signals in response to the one of the two bits of the M-bit carry generation signal and the complementary signal to the one of the two bits of the M-bit carry generation signal;

an eleventh multiplexer for receiving the output signals of the ninth and tenth multiplexers as input signals so as to select two of the input signals in response to the first and second control signals and generating the selected two signals as the first and second control signals of a next carry lookahead addition unit; and a twelfth multiplexer for receiving the output signals of the ninth and tenth multiplexers as input signals so as to select two of the input signals in response to the third and fourth control signals and generating the selected two signals as the third and fourth control signals of the next carry lookahead addition unit.

28. The conditional sum adder according to claim 20, wherein each of the four first carry lookahead addition sections comprises:

four carry lookahead adders, each receiving M/4 bits of the corresponding M-bit carry generation signal and M/4 bits of the corresponding M-bit carry propagation signal and generating a group carry generation signal and a group carry propagation signal; and a fifth carry lookahead adder for receiving the four group carry generation signals and the four group carry propagation signals and generating a corresponding 1-bit carry generation signal and a corresponding 1-bit carry propagation signal.

29. The conditional sum adder according to claim 28, wherein each of the four carry lookahead adders comprises:

means for generating a first output signal in response to a corresponding M/4-bit carry generation signal and a corresponding M/4-bit carry propagation signal; and means for generating a second output signal in response to the corresponding M/4-bit carry generation signal and the corresponding M/4-bit carry propagation signal.

30. The conditional sum adder according to claim 28, wherein the fifth carry lookahead adder comprises:

means for generating a third output signal in response to the four group carry generation signals and the four group carry propagation signals; and means for generating a fourth output signal in response to the four group carry generation signals and the four group carry propagation signals.

31. The conditional sum adder according to claim 28, wherein each of the carry lookahead adders comprises a CMOS pass-transistor logic.

32. The conditional sum adder according to claim 20, wherein the second carry lookahead addition section comprises:

a first carry lookahead adder for receiving the first and second 1-bit carry generation signals and the first and second 1-bit carry propagation signals and generating a first block carry generation signal and a first block carry propagation signal;

a second carry lookahead adder for receiving the first, second, and third 1-bit carry generation signals and the first, second, and third 1-bit carry propagation signals and generating a second block carry generation signal and a second block carry propagation signal;

a third carry lookahead adder for receiving the first, second, third, and fourth 1-bit carry generation signals and the first, second, third, and fourth 1-bit carry propagation signals and generating a third block carry generation signal and a third block carry propagation signal;

a first multiplexer for receiving the first carry generation signal and the first carry propagation signal and generating a first bit signal of the 4-bit carry signal and a complementary signal to the first bit signal of the 4-bit carry signal in response to a 1-bit carry signal corresponding to the 4-bit carry signal and the complementary signal to the 1-bit carry signal corresponding to the 4-bit carry signal;

a second multiplexer for receiving the first block carry generation signal and the first block carry propagation signal and generating a second bit signal of the 4-bit carry signal and a complementary signal to the second bit signal of the 4-bit carry signal in response to the 1-bit carry signal corresponding to the 4-bit carry signal and the complementary signal to the 1-bit carry signal corresponding to the 4-bit carry signal;

a third multiplexer for receiving the second block carry generation signal and the second block carry propagation signal and generating a third bit signal of the 4-bit carry signal and a complementary signal to the third bit signal of the 4-bit carry signal in response to the 1-bit carry signal corresponding to the 4-bit carry signal and the complementary signal to the 1-bit carry signal corresponding to the 4-bit carry signal; and a fourth multiplexer for receiving the third block carry generation signal and the third block carry propagation signal and generating a fourth bit signal of the 4-bit carry signal and a complementary signal to the fourth bit signal of the 4-bit carry signal in response to the 1-bit carry signal corresponding to the 4-bit carry signal and the complementary signal to the 1-bit carry signal corresponding to the 4-bit carry signal.

33. The conditional sum adder according to claim 32, wherein each of the first, second, and third carry lookahead adders comprises:

means for generating a corresponding block carry generation signal having one of the two different levels in response to a corresponding section carry generation signal and a corresponding section carry propagation signal; and means for generating a corresponding block carry propagation signal having one of the two different levels in response to the section carry propagation signal.

34. The conditional sum adder according to claim 20, wherein each of the two sum generators comprises a pass-transistor logic and each of the two carry generators comprises a CMOS logic.

35. An N-bit conditional sum adder wherein N is the number of adding bits, comprising:

K M-bit sum generators, each of which receives a first M-bit input signal, a complementary signal to the first M-bit input signal, a second M-bit input signal, a complementary signal to the second M-bit input signal, one carry signal corresponding to an L-bit carry signal or the complementary signal to the L-bit carry signal, and a complementary signal to the carry signal, and generates an M-bit sum signal, wherein K is equal to ⌈N/M⌉ and ⌈ ⌉ represents the ceiling function, which returns the smallest integer greater than or equal to its operand; and X L-bit carry generators, each of which receives an (L×M)-bit carry generation signal and an (L×M)-bit carry propagation signal from L corresponding sum generators and generates an L-bit carry signal and a complementary signal to the L-bit carry signal, wherein X is equal to ⌈K/L⌉, wherein each of the M-bit sum generators comprises:

a pre-carry and pre-sum generation block for receiving the first M-bit input signal, a complementary signal to the first M-bit input signal, a second M-bit input signal, and a complementary signal to the second M-bit input signal and generating a first M-bit conditional sum signal, a second M-bit conditional sum signal, an M-bit carry propagation signal, a complementary signal to the M-bit carry propagation signal, an M-bit carry generation signal, and a complementary signal to the M-bit carry generation signal; and an M-bit carry lookahead addition block for receiving the first M-bit conditional sum signal, the second M-bit conditional sum signal, the M-bit carry generation signal, the complementary signal to the M-bit carry generation signal, the M-bit carry propagation signal, the complementary signal to the M-bit carry propagation signal, one carry signal corresponding to the L-bit carry signal or the complementary signal to the L-bit carry signal, and the complementary signal to the carry signal and generating the M-bit sum signal; and wherein each of the X L-bit carry generators comprises:

a group of first carry lookahead addition sections, each of which receives a corresponding M-bit carry generation signal and a corresponding M-bit carry propagation signal and generates a 1-bit carry generation signal and a 1-bit carry propagation signal; and a second carry lookahead addition section for receiving the carry generation signals and the carry propagation signals from the group of first carry lookahead addition sections and generating the L-bit carry signals and the complementary signals to the L-bit carry signals.

36. An integrated pass-transistor logic circuit comprising:

an encoding means for receiving a first 54-bit data signal and a second 54-bit data signal and generating a first to a fifty-fourth 54-bit vertical data signals, wherein the encoding means generates the second 54-bit data signal as a corresponding vertical data signal when a bit value of the first 54-bit data signal is at logical "1" state, and generates a vertical data signal of logical "0" state when a bit value of the first 54-bit data signal is at logical "0" state;

a compressing means for receiving the first to fifty-fourth vertical data signals and compressing each of the vertical data signals to a 2-bit signal to generate a 54-bit sum signal and a 54-bit carry signal; and an adding means for adding the 54-bit sum signal and the 54-bit carry signal from the compressing means, wherein the adding means comprises:

a first to a seventh 16-bit sum generators, each of which receives a first 16-bit input signal, a complementary signal to the first 16-bit input signal, a second 16-bit input signal, a complementary signal to the second 16-bit input signal, a carry signal corresponding to a 4-bit carry signal or to a complementary signal to the 4-bit carry signal, and a complementary signal to the carry signal and generates a 16-bit sum signal;

a first carry generator for receiving a 64-bit carry generation signal and a 64-bit carry propagation signal from four corresponding sum generators and generating the 4-bit carry signal and the complementary signal to the 4-bit carry signal; and a second carry generator for receiving the other carry generation and propagation signals and generating the carry signal and the complementary signal to the carry signal.

37. The integrated pass-transistor logic circuit according to claim 36, wherein the compressing means comprises fifty-four compression units for compressing each of the vertical data signals to a 1-bit sum signal and a 1-bit carry signal, each of the compression units comprising:

six 9-to-2 compressors, each of which compresses a 9-bit data signal provided from the encoding means to a 2-bit data signal;

two 6-to-2 compressors, each of which compresses a 6-bit data signal provided from the six 9-to-2 compressors to a 2-bit data signal; and a 4-to-2 compressor which compresses a 4-bit data signal provided from the two 6-to-2 compressors to a 2-bit data signal.

38. The integrated pass transistor logic circuit according to claim 37, wherein each of the 9-to-2 compressors receives the 9-bit data signal provided from the encoding means and a 6-bit data signal provided from a corresponding 9-to-2 compressor of a pre-stage compression unit, and generates a first carry bit signal, a sum bit signal and a 6-bit signal to be provided to a corresponding 9-to-2 compressor of a next stage compression unit.

39. The integrated pass transistor logic circuit according to claim 37, wherein each of the 6-to-2 compressors receives the 6-bit data signal provided from the 9-to-2 compressors and a 3-bit data signal provided from a corresponding 6-to-2 compressor of the pre-stage compression unit, and generates a second carry bit signal, a second sum bit signal and a 3-bit data signal to be provided to a corresponding 6-to-2 compressor of the next stage compression unit.

40. The integrated pass transistor logic circuit according to claim 37, wherein the 4-to-2 compressor receives a 4-bit vertical signal provided from the 6-to-2 compressors and a 1-bit data signal from a 4-to-2 compressor of the pre-stage compression unit and generates a third carry bit signal, a third sum bit signal and a 1-bit data signal to be provided to a corresponding 4-to-2 compressor of the next stage compression unit.

41. The integrated pass transistor logic circuit according to claim 37, wherein each of the 9-to-2 compressors comprises:

three full-adders, each of which receives three bits of the 9-bit data signal provided from the encoding means and generates three sum bit signals and first, second, and third carry bit signals, the first, second, and third carry bit signals to be provided to a corresponding 9-to-2 compressor of the next stage compression unit;

a fourth full-adder for receiving the three sum bit signals and generating a fourth sum bit signal and a fourth carry bit signal, the latter to be provided to the corresponding 9-to-2 compressor of the next stage compression unit;

a fifth full-adder for receiving the first, second, and third carry bit signals from a corresponding 9-to-2 compressor of the pre-stage compression unit and generating a fifth sum bit signal and a fifth carry bit signal, the latter to be provided to the corresponding 9-to-2 compressor of the next stage compression unit;

a sixth full-adder for receiving the fourth and fifth sum bit signals and a fourth carry bit signal from the corresponding 9-to-2 compressor of the pre-stage compression unit and generating a sixth sum bit signal and a sixth carry bit signal, the latter to be provided to the corresponding 9-to-2 compressor of the next stage compression unit; and a seventh full-adder for receiving the sixth sum bit signal and the fifth and sixth carry bit signals from the corresponding 9-to-2 compressor of the pre-stage compression unit and generating a first final sum signal and a first final carry bit signal.

42. The integrated pass transistor logic circuit according to claim 41, wherein each of the full-adders comprises:

four output terminals for generating the carry signal, a complementary signal to the carry signal, a sum signal and a complementary signal to the sum signal;

a first inverter having an input terminal connected to the second output terminal and an output terminal for generating the carry signal;

a second inverter having an input terminal connected to the first output terminal and an output terminal for generating the complementary signal to the carry signal;

a first PMOS transistor having a current path connected between the input terminal of the first inverter and the output terminal of the second inverter, and a gate connected to the input terminal of the second inverter;

a second PMOS transistor having a current path connected between the output terminal of the first inverter and the input terminal of the second inverter, and a gate connected to the input terminal of the first inverter;

a third inverter having an input terminal connected to the fourth output terminal and an output terminal for generating the sum signal;

a fourth inverter having an input terminal connected to the third output terminal and an output terminal for generating the complementary signal to the sum signal;

a third PMOS transistor having a current path connected between the input terminal of the first inverter and the output terminal of the second inverter, and a gate connected to the input terminal of the second inverter; and a fourth PMOS transistor having a current path connected between the output terminal of the first inverter and the input terminal of the second inverter, and a gate connected to the input terminal of the first inverter.

43. The integrated pass transistor logic circuit according to 37, wherein each of the 6-to-2 compressors comprises:

eighth and ninth full-adders, each of which receives three bits of a 6-bit data signal from three corresponding 9-to-2 compressors and generates seventh and eighth sum bit signals and seventh and eighth carry bit signals, the seventh and eighth carry bit signals to be provided to a corresponding 6-to-2 compressor of the next stage compression unit;

a tenth full-adder for receiving three carry bit signals provided from a corresponding 6-to-2 compressor of the pre-stage compression unit and generating a ninth sum bit signal and a ninth carry bit signal, the latter to be provided to the corresponding 6-to-2 compressor of the next stage compression unit; and an eleventh full-adder for receiving the seventh, eighth, and ninth sum bit signals and generating a second final sum signal and a second final carry bit signal.

44. The integrated pass transistor logic circuit according to claim 37, wherein the 4-to-2 compressor comprises:

a twelfth full-adder for receiving a lower-order 3-bit signal of a 4-bit vertical data signal provided from a corresponding 6-to-2 compressor and generating a tenth sum bit signal and a tenth carry bit signal, the latter to be provided to a corresponding 4-to-2 compressor of the next stage compression unit; and a thirteenth full-adder for receiving a most significant bit of the 4-bit vertical data signal, the tenth sum bit signal and a tenth carry signal provided from a 4-to-2 compressor of the pre-stage compression unit and generating a third final sum signal and a third final cany bit signal.

* * * * *

UNITED STATES PATENT AND TRADEMARK OFFICE
CERTIFICATE OF CORRECTION

PATENT NO.    : 6,012,079
DATED         : January 4, 2000
INVENTOR(S)   : Song

It is certified that error appears in the above-identified patent and that said Letters Patent is hereby corrected as shown below:

Column 8,
Line 65, "fill" should read -- full --;

Column 14,
Line 41, "fiction" should read -- function --;

Column 34,
Line 44, "cany" should read -- carry --.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,012,079
DATED         : January 4, 2000
INVENTOR(S)   : Song

It is certified that error appears in the above-identified patent and that said Letters Patent is hereby corrected as shown below:

Column 8,
Line 64, "1-bit fill adder" should read -- 1-bit full adder --.

Column 14,
Line 41, "fiction block 166" should read -- function block 166 --.

Column 17,
Line 15, "has f CLA1" should read -- has five CLA1 --.

Column 19,
Line 29, "ceiling flnction, which" should read -- ceiling function, which --.

Signed and Sealed this

Thirteenth Day of July, 2004

JON W. DUDAS
*Acting Director of the United States Patent and Trademark Office*